US010509364B2

(12) United States Patent
Kroll et al.

(10) Patent No.: US 10,509,364 B2
(45) Date of Patent: Dec. 17, 2019

(54) LIGHT MODULATOR FOR A DISPLAY FOR DISPLAYING TWO-DIMENSIONAL AND/OR THREE-DIMENSIONAL IMAGE CONTENTS

(75) Inventors: Bo Kroll, London (GB); Norbert Leister, Dresden (DE); Stephan Reichelt, Dresden (DE); Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 1110 days.

(21) Appl. No.: 13/499,113

(22) PCT Filed: Sep. 29, 2010

(86) PCT No.: PCT/EP2010/064504
§ 371 (c)(1),
(2), (4) Date: May 3, 2012

(87) PCT Pub. No.: WO2011/039286
PCT Pub. Date: Apr. 7, 2011

(65) Prior Publication Data
US 2012/0206667 A1 Aug. 16, 2012

(30) Foreign Application Priority Data

Sep. 29, 2009 (DE) .................. 10 2009 045 125
Dec. 18, 2009 (DE) .................. 10 2009 059 095

(51) Int. Cl.
*G03H 1/02* (2006.01)
*G02F 1/13363* (2006.01)
(Continued)

(52) U.S. Cl.
CPC ............. *G03H 1/02* (2013.01); *H04N 13/302* (2018.05); *H04N 13/359* (2018.05);
(Continued)

(58) Field of Classification Search
CPC ............... G02F 1/1335; G02F 1/13363; G02F 2001/133769; G03H 1/02; G03H 1/2294;
(Continued)

(56) References Cited

U.S. PATENT DOCUMENTS 5,917,562 A * 6/1999 Woodgate ............. G02B 27/26
349/15
6,055,027 A * 4/2000 Yamazaki ............. G02B 27/26
349/15
(Continued)

FOREIGN PATENT DOCUMENTS

DE 10 2009 002 987 A1 11/2009
DE 10 2009 028 626 A1 1/2011
(Continued)

OTHER PUBLICATIONS

International Search Report, dated Jan. 17, 2011, issued in priority International Application No. PCT? EP2010/064504.
(Continued)

*Primary Examiner* — Charles S Chang
(74) *Attorney, Agent, or Firm* — Saul Ewing Arnstein & Lehr LLP

(57) ABSTRACT

A light modulator, for a display for the presentation of two- and/or three-dimensional image contents or image sequences, includes two opposing substrates and electrodes. At least one liquid crystal layer is provided between the two substrates. An alignment means is provided on the substrate which faces the liquid crystal layer to set a predeterminable initial alignment of the liquid crystals. The orientation of the liquid crystals can be controlled in a given range through an electric field generated by the electrodes. The alignment means is controllable and can be controlled to modify the initial alignment of the liquid crystals. The alignment can be controlled such the orientation of the liquid crystals can be oriented outside the given range or so that the initial align-
(Continued)

PSS with switchable surface orientation (VR1 -> VR2) and all up 180° settable turning angle of the LC molecules 2 ment of the liquid crystals can be set specifically for certain positions.

16 Claims, 19 Drawing Sheets

(51) Int. Cl.
  *H04N 13/302* (2018.01)
  *H04N 13/359* (2018.01)
  *G03H 1/22* (2006.01)
  *G02F 1/1337* (2006.01)

(52) U.S. Cl.
  CPC .......... *G02F 1/13363* (2013.01); *G02F 2001/133769* (2013.01); *G03H 1/2294* (2013.01); *G03H 2001/0224* (2013.01); *G03H 2225/22* (2013.01)

(58) Field of Classification Search
  CPC ....... G03H 2001/0224; G03H 2225/22; H04N 13/302; H04N 13/359
  USPC .......................................................... 349/15
  See application file for complete search history.

(56) References Cited

U.S. PATENT DOCUMENTS

| | | | | |
|---|---|---|---|---|
| 7,532,272 | B2* | 5/2009 | Woodgate | G02B 27/2214 349/95 |
| 2003/0137620 | A1* | 7/2003 | Wang | G02B 5/3016 349/95 |
| 2005/0179855 | A1 | 8/2005 | Helgee et al. | |
| 2006/0098281 | A1* | 5/2006 | Fukushima | G02B 27/2214 359/464 |
| 2006/0126156 | A1* | 6/2006 | Evans et al. | 359/320 |
| 2007/0002267 | A1 | 1/2007 | Mochizuki | |
| 2007/0098918 | A1* | 5/2007 | Komitov | G02F 1/133711 428/1.1 |
| 2007/0182885 | A1* | 8/2007 | Egi | G02F 1/133528 349/96 |
| 2008/0013002 | A1* | 1/2008 | Hong | G02B 3/12 349/15 |
| 2009/0073331 | A1 | 3/2009 | Shi et al. | |
| 2010/0026920 | A1* | 2/2010 | Kim | H04N 13/0404 349/15 |
| 2010/0110317 | A1* | 5/2010 | Chen | G02F 1/133553 349/15 |
| 2010/0149444 | A1* | 6/2010 | Hikmet | G02B 27/225 349/15 |
| 2011/0261295 | A1* | 10/2011 | Kim | G02F 1/133707 349/96 |
| 2012/0242661 | A1* | 9/2012 | Takagi | G09G 3/003 345/419 |

FOREIGN PATENT DOCUMENTS

| | | |
|---|---|---|
| WO | 00/03288 | 1/2000 |
| WO | 03/081326 A1 | 10/2003 |
| WO | 2010/149587 A2 | 12/2010 |

OTHER PUBLICATIONS

Ph. J. Martin, "Recent Patents on Liquid Crystal Alignment", Recent Patents on Material Science 2008, 1, 21-28.
L.M. Blinov, V.G. Chigrinov, "Electrooptic Effects in Liquid Crystal Materials", Springer Verlag, 1994.
Jong-Hyun Kim, Makoto Yoneya & Hiroshi Yokoyama,"Tristable nematic liquid-crystal device using micropatterned surface alignment", Nature, 420, p. 159-162, 2002.
S. Pancharatnam Proc.Ind.Acad. Sci, p. 137, 1955.
L. Shi, P.F. MacManamon, P.J. Bos, "Liquid crystal optical phase plate with variable in-plane gradient", J. Appl. Phys., 104, 0033109, 2008.
L. Komitov, Journal of the SID 2008, p. 919-925.
J. E. Stockley, S. A. Serati, G. D. Sharp, P. Wang, K. F. Walsh and K. M. Johnson "Broadband beam steering", Proc SPIE vol. 3131, 1997.

* cited by examiner

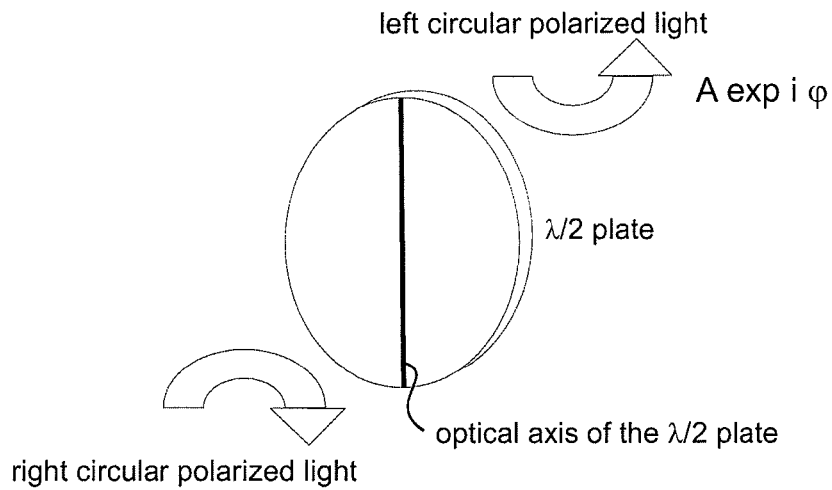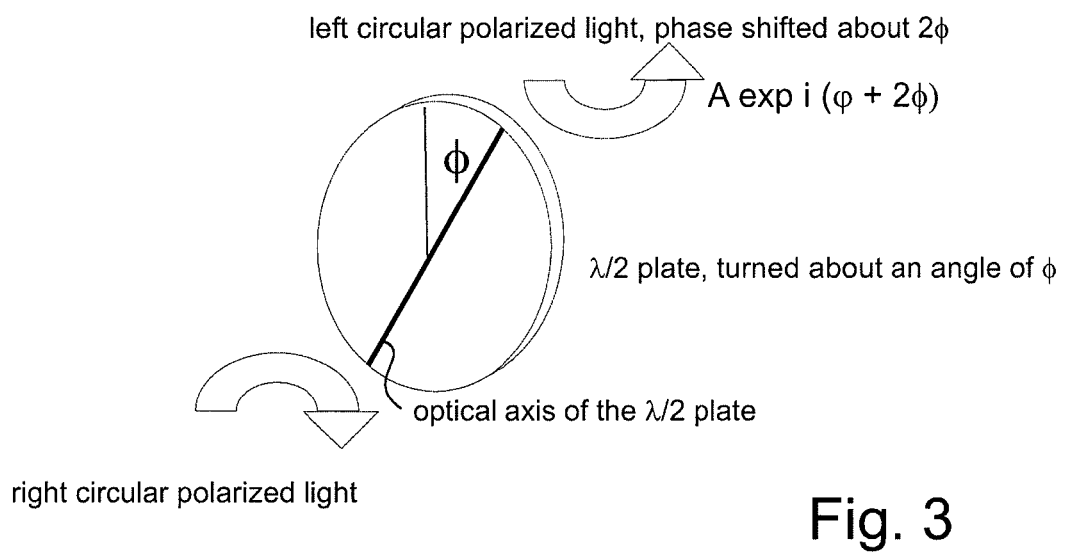
Fig. 3

IPS with a predefined pre-tilt according to the prior art: the direction of turn of the LC molecules is predefined by the pre-tilt $\varepsilon$ IPS with a switchable pre-tilt +/- ε (VR1 -> VR2)
the direction of turn of the LC molecules 2 can be selected by setting the pre-tilt to +/- ε

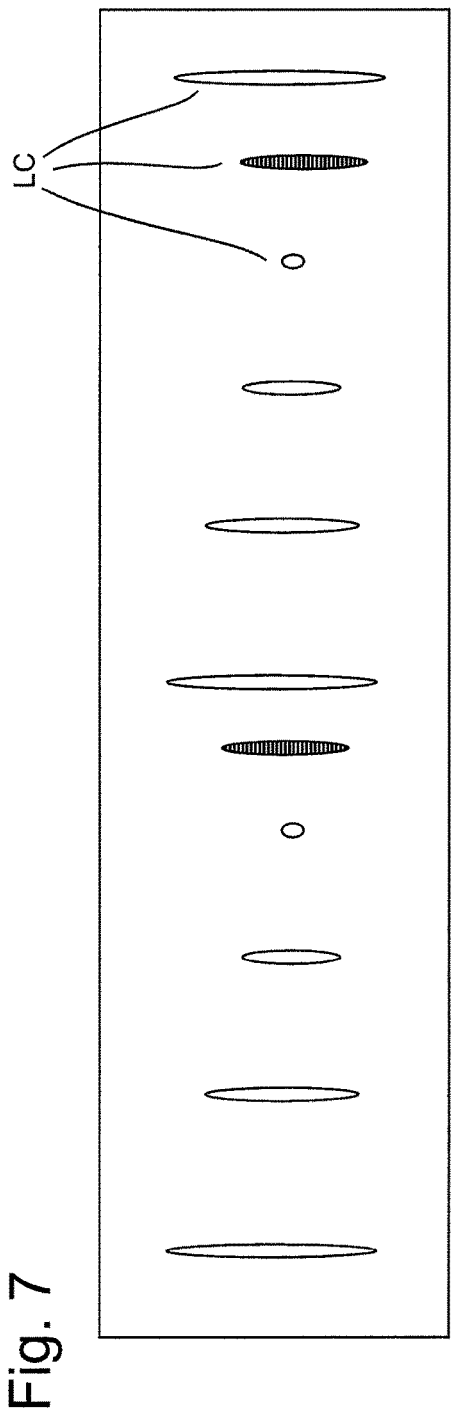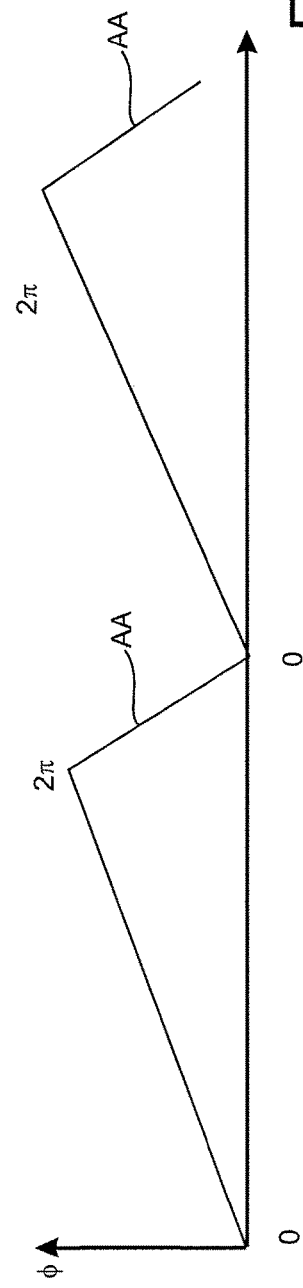
Fig. 7
Fig. 7a
Fig. 7b
LC phase grating for phase modulation with linear polarized light according to the prior art: flyback region because of smoothing of the transition from 2π to 0 (LC molecule indicated in black)

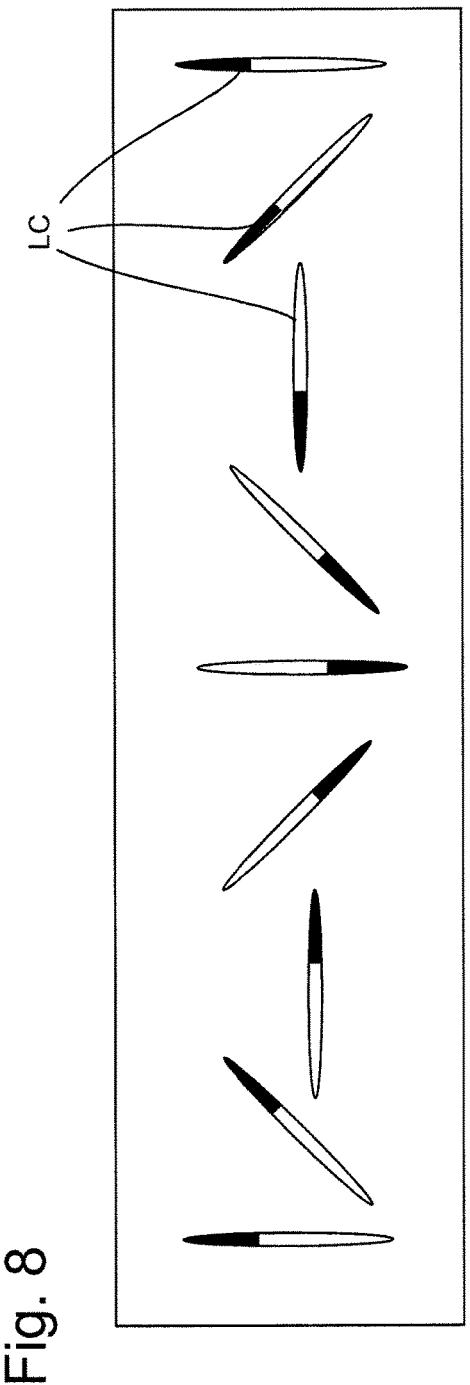
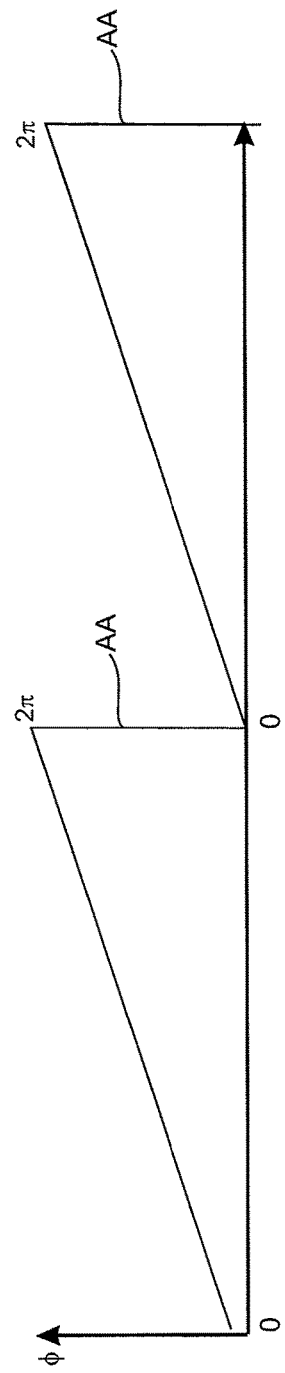
Fig. 8
Fig. 8a
Fig. 8b
LCPG according to the prior art for the phase modulation with circular polarized light
no flyback region – high diffraction efficiency

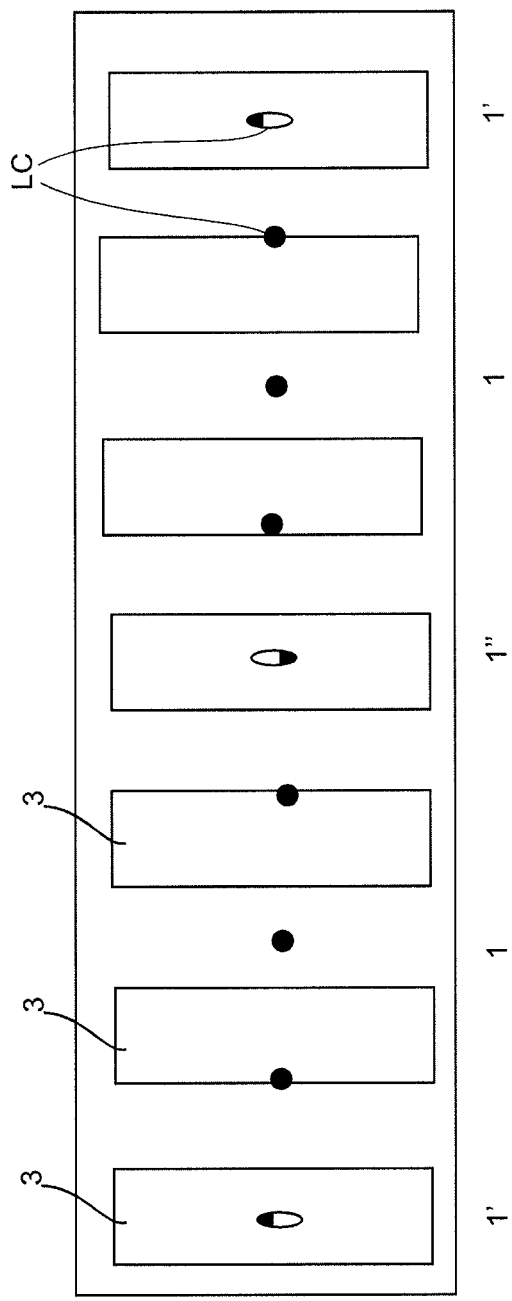

V-COPA with an E-field being switched on according to the prior art LC orientation at 1' and 1'' induced by the surface, at 4 and 4' by a voltage difference between two electrodes V-COPA according to the invention with a switchable surface orientation between the three states 1, 1' and 1" being adjusted to the respective pitch of the grating, here shown with an E-field being switched on Fig. 14
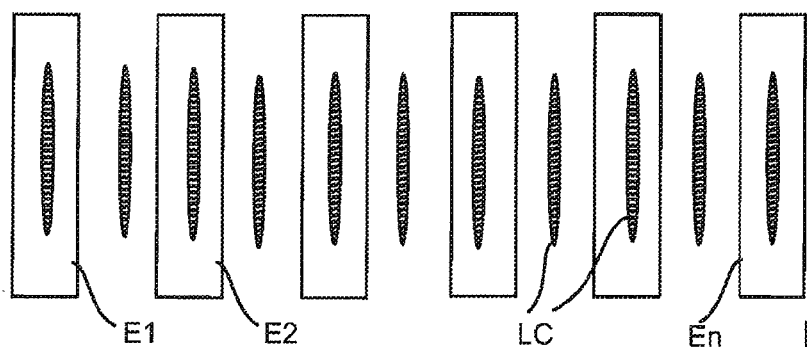
Fig. 14a
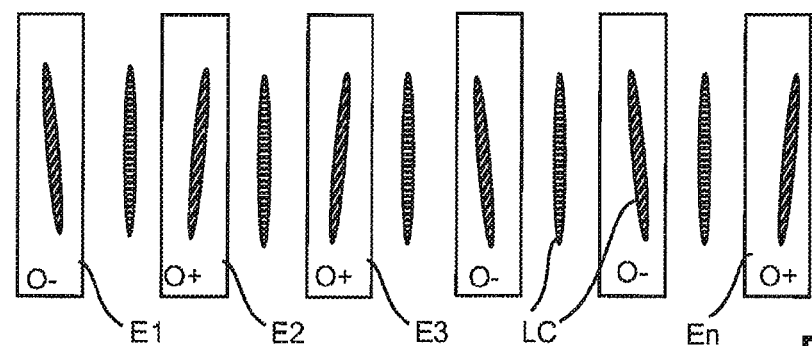
Fig. 14b
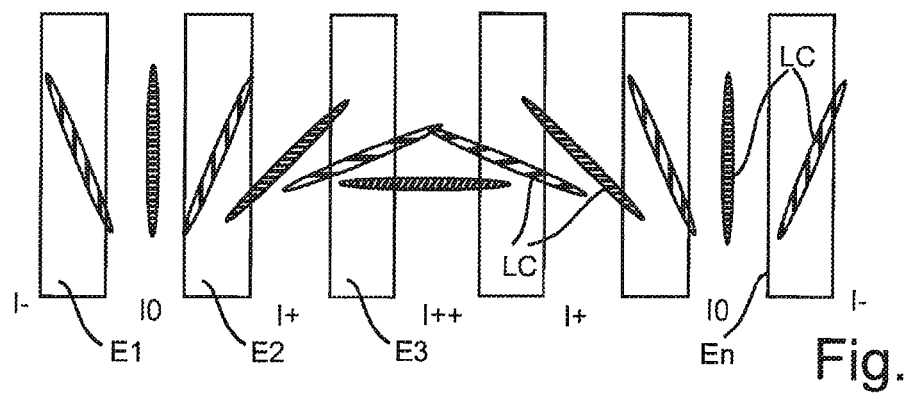
Fig. 14c Fig. 15
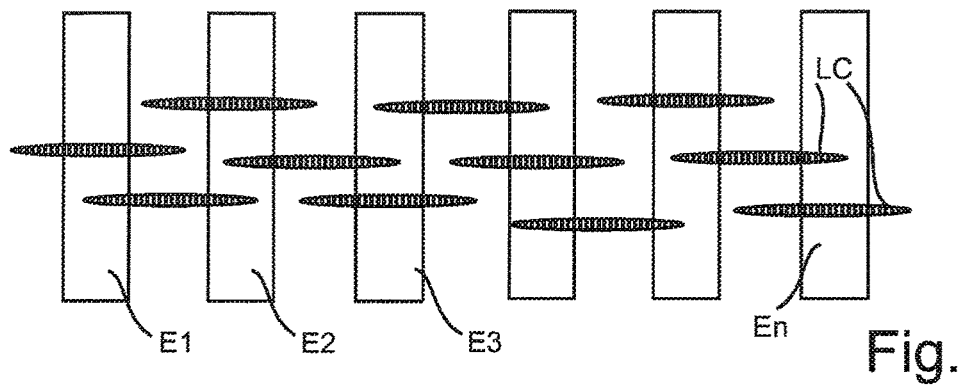
Fig. 15a
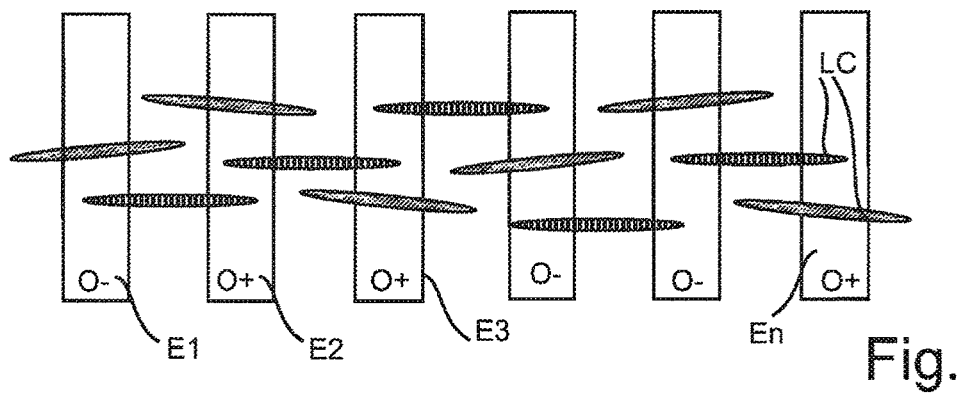
Fig. 15b
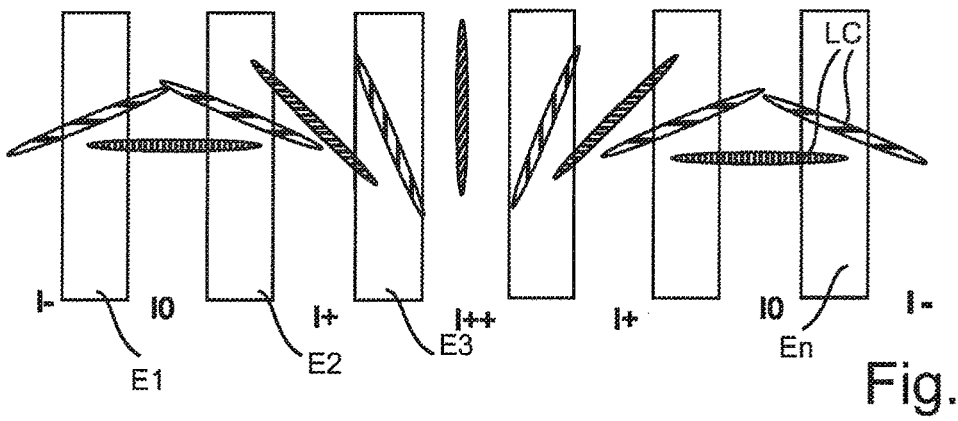
Fig. 15c

LIGHT MODULATOR FOR A DISPLAY FOR DISPLAYING TWO-DIMENSIONAL AND/OR THREE-DIMENSIONAL IMAGE CONTENTS

CROSS REFERENCE TO RELATED APPLICATIONS

This application claims the priority of PCT/EP2010/064504, filed on Sep. 29, 2010, which claims priority to German Application Nos. 10 2009 045125.0, filed Sep. 29, 2009; and 10 2009 059095.1, filed Dec. 18, 2009, the entire contents of all of which are hereby incorporated in total by reference.

BACKGROUND OF THE INVENTION

The present invention relates to a light modulator for a display for the presentation of two- and/or three-dimensional image contents. The present invention further relates to a display and to a method for operating a light modulator.
LC Alignment Layers Conventional liquid crystal displays (LC displays) are typically based on an equilibrium of an interaction of the LC molecules with a surface and an interaction with an electric field.

A surface interaction defines a preferred orientation of the LC molecules during the absence of an electric field. If an electric field is applied, then a force is exerted on the molecules which is usually opposing the surface orientation or which is effective in a predetermined direction. Depending on the electric field strength and on the elastic forces among the LC molecules, the LC molecules will rotate into a resultant orientation. There is typically a threshold field strength above which the orientation of the LC molecules will not change compared with the situation without field. Further, there is a saturation field strength, which means that in fields which are stronger than that saturation field strength the orientation of the LC molecules will change no further. Between said threshold field strength and said saturation field strength, the LC orientation will change along with the field strength, in particular continuously.

In a conventional LC display, such as in a PC monitor, this variable orientation serves for the representation of grey-scale values in dependence on the control voltage of an LC pixel.

As far as defining the surface interaction is concerned, there are a number of methods known in the prior art. As a standard, a polyimide layer is used in LC displays which is given a preferred orientation by mechanical rubbing or brushing. At the interface with the polyimide layer, the LC molecules align such that their long axes are parallel to the rubbing direction. The strength of the surface interaction can be varied by accordingly choosing certain parameters during the manufacturing process, e.g. by applying different mechanical rubbing pressure.

Depending on the type of LC display, one of these three orientations is required: a planar orientation where the preferred orientation of the LC molecules is parallel to the surface of the glass substrate, a homeotropic orientation, where the preferred orientation of the LC molecules is perpendicular to the surface of the glass substrate or a tilted orientation where the preferred orientation of the LC molecules has a defined angle to the surface of the glass substrate. A planar orientation is for example typically used in an in-plane switching (IPS) display, whereas a substantially homeotropic orientation is for example used in a vertical-alignment (VA) display.

Certain types of LC materials—for example nematic LCs with a positive dielectric anisotropy—preferably align such that their long axes are parallel to an electric field. Other LC materials—for example nematic LCs with a negative dielectric anisotropy—preferably align such that their long axes are perpendicular to an electric field.

A certain combination of surface orientation on one substrate or on either substrate with a type of LC material and an arrangement of electrodes will be referred to below as an LC mode; so for example the combination of planar orientation on either substrate, nematic LCs with positive dielectric anisotropy and electrodes which are arranged such that they generate an in-plane field is referred to as IPS mode.

Now, a surface interaction could be defined with a number of different materials and using various methods. In addition to the method of rubbing polyimide, which has already been mentioned above, it is further possible to use a material in the form of silicon oxide films which are vapour-deposited, where the parameters of the vapour deposition process are chosen such that a suitable preferred orientation of the LC molecules is achieved. Moreover, a light-sensitive polymer material could be given a preferred orientation by way of optical methods e.g. using UV light (photo-alignment), where that preferred orientation serves to align the LC molecules accordingly. Publication [1] provides an overview of alignment layers which are known in the prior art.

Usually, the entire display panel of an LC display is given a uniform and fix preferred orientation. However, a spatially structured preferred orientation could be provided alternatively which makes it possible to realise for example different orientations of the LC molecules for each pixel.

Still further, switchable preferred orientations are known in the prior art: Blinov/Chrinov describe in their book "Electrooptic Effects in Liquid Crystal Materials", under the headline "Multistable Orientation", p. 125 [2], that for a nematic liquid crystal in contact with a crystalline substrate which comprises an n-fold rotational symmetry of the crystal, where n is an integer number, the LC molecules can generally have n different orientations along one of these directions defined by the crystal. Individual domains can then form with different orientations along one of these n directions. An external in-plane field can switch the orientation in individual domains to a different one of the n possible directions. It is further described that a multistable orientation can also be achieved with the help of vapour-deposited silicon oxide films. An electric field can then serve to switch from one of the stable orientations to another one. That text further describes the concept of a bistable LC display which is based on the switching of a nematic LC between two possible surface orientations. If no electric field is present, then the molecules remain in one of the possible preferred orientations. This makes the display similarly energy-saving as a bistable ferroelectric LC, because no power is required to display unchanging content.

Further, publication [3] describes a tristable LC device which is based on a finely-patterned surface structure. A very fine spatial pattern of different preferred orientations is written to a polyimide surface. The microscopic pattern causes three equally stable LC orientations to be realised macroscopically. An electric in-plane field serves to switch between them.

The photo-alignment technique could also be taken advantage of for optically switching between the surface orientations, e.g. such that photosensitive molecules in the surface layer of a polymer material change their conformation under the influence of UV radiation, thereby inducing different preferred orientations of the LC molecules which are attached to this surface layer of the polymer material. This way, the LC orientation can be switched through the surface interaction in an optically addressed spatial light modulator (OASLM). This photo-alignment technique can for example also serve to switch from a planar to a homeotropic orientation of the LC molecules. A disadvantage of optical switching is its low speed, so that it is hardly suitable for use in a light modulator which is supposed to work at high refresh rates.

There are different liquid-crystal phases. In nematic liquid crystals, a uniform orientation of molecule axes is energetically favoured. However, the position of the individual molecules is distributed statistically. In smectic liquid crystals, the molecules additionally find together in layers. A special type of smectic liquid crystals, the chiral smectic C phase (SmC*) comprises ferroelectric properties. Due to the hysteresis which is caused by ferroelectricity, this type also allows a bistable display to be realised. A certain voltage threshold is necessary to switch the LC molecules into one state. They will remain in this state until a voltage with opposite sign and absolute value which is also above said threshold is applied. Then, they will switch to the other state. During this, an out-of-plane electric field is applied. However, the LC molecules rotate in a plane which lies parallel to the substrate. In addition to ferroelectric LCs (FLC), there are further phases with similar properties, for example anti-ferroelectric and ferrielectric. Ferroelectric LCs are characterised by their high switching speed. However, they have other disadvantages. Moreover, arrangements have been described which comprise SmC* LCs but which do not comprise hysteresis and thus no bistability, but a continuous variation in the LC orientation as the applied voltage is changed, which is referred to as the V-shaped FLC mode.

Publication WO 00/03288 A1 describes an electro-optical device whose surface layer itself has liquid-crystal—or, more precisely, chiral smectic—properties. That device additionally comprises a bulk LC layer which can for example also be a nematic LC.

The orientation of the liquid crystals in the surface layer can be switched by applying an electric field ("primary surface switching"). That surface layer then induces a certain orientation of the bulk layer ("induced bulk switching"). For example, the LCs in the bulk layer can have a preferred orientation that is parallel to that of the LC molecules in the surface layer. An additional fix separate (conventional) surface layer can be provided which determines the absolute orientations in order to align the smectic LC molecules of the dynamic surface layer in relation to that separate layer in their bistable switching states. A controllable surface layer will also be referred to as alignment means below.

The publication highlights the high switching speed of the smectic LCs in the surface layer as the major advantage. The idea is to achieve shorter response times for example of nematic LCs in the bulk layer thanks to the induced alignment of the bulk layer than would be achievable when controlling of the bulk layer directly.

The publication also includes an embodiment in which an alignment of the bulk layer which is induced with the help of the surface layer can be combined as a two-stage effect with a direct alignment of the bulk layer which is realised with the help of an electric field. In that embodiment, the threshold of the electric field strength for direct alignment of the bulk layer is higher than the field strength which is required for switching the surface layer. A change in the orientation of the molecules of the bulk layer in the plane which is parallel to the substrate can thus be induced by applying a low out-of-plane electric field below the threshold field strength and thus by switching the surface layer. A stronger out-of plane field which is applied to the same electrodes controls the bulk layer directly such that the LC molecules rotate out of the plane which is parallel to the substrate.

Instead of a separate surface layer which is immiscible with the bulk layer, publication WO 03/081326 describes how a bulk layer is doped with molecules which are distributed in the bulk layer but firmly attached to the surface. The spatial separation of surface layer and bulk layer is thereby overcome, but still an alignment in the bulk layer is induced with the help of the defined orientation in the surface layer. The surface layer can for example include side-chain polymers whose side chain can be rotated, i.e. aligned, in relation to the main chain, while the backbone chain serves to provide the firm connection with the surface.

Phase Modulation

Phase-modulating SLMs are required for coherent optical applications, such as holographic display devices. These are typically light modulators which have pixels that are regularly arranged in the x and y dimension. The pixels are made such to modulate the phase of the light which interacts with the light modulator. The modulation of the light which interacts with a pixel is in particular relative to the modulation of the light which interacts with another pixel. For a given wavelength—for example in the visible range—this requires a phase modulation of between 0 and $2\pi$. Holographic display devices require particularly fast phase-modulating light modulators.

Several types of conventional amplitude-modulating LC displays can be modified easily such to modulate the phase instead of the amplitude, e.g. by changing the polarisation of the incident light. However, the required phase range of up to $2\pi$ can hardly be served then; the phase range of such modified display panels is for example only 0 to $\pi$.

LC modes such as electrically controlled birefringence (ECB) or vertical alignment (VA) require a combination of layer thickness d and birefringence $\Delta n$ such to satisfy the equation $\Delta n \cdot d = \lambda/2$ for amplitude modulation, but rather $\Delta n \cdot d \geq \lambda/2$ for phase modulation up to $2\pi$, where $\lambda$ is the wavelength of the light which is to be modulated.

Compared to an amplitude-modulating light modulator, a phase-modulating light modulator which uses one of these LC modes either requires an LC material with a larger refractive index, which often also shows higher viscosity, i.e. which reacts more slowly, or which comprises a greater layer thickness, where conventionally the response time of a nematic LC is about proportional to its squared layer thickness. This is why a phase-modulating light modulator based on those display types would be disadvantageously slower than a comparable amplitude-modulating display.

However, it would generally be possible to accelerate these LC modes by using a dynamic alignment layer while maintaining the range of possible orientations of the LCs. But the slowest switching operations are grey-to-grey transitions in an amplitude-modulating display, or, adapted to phase modulation, the transitions among medium phase shifts. Since there is only a limited number of defined surface orientation states, it must be suspected that not all required phase steps can be accelerated as desired.

ECB and VA in the above-mentioned configuration require linear polarised light for phase modulation.

Another possibility of phase modulation according to Pancharatnam [4] takes advantage of circular polarised light and a controllable $\lambda/2$ plate (therefore $\Delta n \, d = \lambda/2$ applies here). If the optical axis of the $\lambda/2$ plate is turned by the angle φ in the plane which is parallel to the surface, then a phase modulation of 2φ is obtained. An angle φ of 180 degrees is required to achieve a phase of 2π.

Similarly, a reflective arrangement can be provided like this: Circular polarised light passes through a rotatably arranged λ/2 plate, then through a fix λ/4 plate, then hits a reflective layer and passes on its way back the fix λ/4 plate and the rotatably arranged λ/2 plate again. The rotatably arranged λ/2 plate can for example be realised in the form of a suitable layer of liquid crystals. The fix λ/4 plate can for example be realised in the form of a polymer film. If the λ/2 plate is turned by the angle φ, then the light will undergo on its way to the reflector a phase modulation by twice that angle, i.e. by 2φ, and after reflection on the way back another phase modulation by 2φ, i.e. altogether by 4φ. A total angular range of φ=90 degrees is then required to realise a phase modulation of up to 360 degrees (2π).

Another possibility of embodying a reflective arrangement according to the prior art is to use a rotatably arranged λ/4 plate and a reflective layer, where the λ/4 plate is passed twice, namely on the way to the reflector and on the way back, so that it has the effect of a transmissive rotatably arranged λ/2 plate for the light. The rotatably arranged λ/4 plate can for example be realised in the form of a suitable layer of liquid crystals. In that case, the phase modulation that is realised when the λ/4 plate is rotated by the angle φ is again twice that rotation angle, i.e. 2φ. An angular range of altogether φ=180 degrees is again required to realise a phase modulation of up to 360 degrees (2π). Where LC-based phase-modulating light modulators are used, the layer thickness of the λ/4 plate is halved compared with a transmissive modulator, which can have a positive effect on the response time.

Both possibilities for reflective modulators are described in publication [7] and shown schematically in FIG. 2 there.

With LCs, the optical axis typically corresponds with the long axes of the LC molecules. The optical axis can thus be tilted by tilting the LC molecules accordingly in the plane.

Certain types of LC displays, such as in-plane switching (IPS) or polarisation-shielded smectic (PSS), see for example publication US 2007002267 A1, use a layer thickness of Δn d=λ/2 and rotate the LC molecules by controlling them through an in-plane field. PSS-type amplitude modulations are particularly fast. Control frequencies of up to 1 kHz and more have been achieved. IPS uses nematic LCs and an in-plane electric field. PSS uses smectic molecules and an out-of-plane electric field. To achieve amplitude modulation, these LC modes conventionally work with linear polarised light. However, it would be easily possible to modify the polarisation state. For example, a λ/4 plate can be used in order to convert linear polarised light into circular polarised light. Nematic and smectic molecules differ in that nematic molecules align in the same direction irrespective of the sign of the applied voltage, while the orientation of certain smectic LC molecules depends on whether a positive or negative voltage is applied.

In a PSS-type phase-modulating light modulator, the direction of rotation and thus the phase depends on the sign of the voltage. Document DE 10 2009 002 987.7 describes the use of the PSS mode in a phase-modulating light modulator using circular polarised light under consideration of the sign of the voltage. However, the conventional rotation angle of the LC molecules in the IPS and PSS modes does not suffice to realise a phase modulation of 2π.

In a transmissive PSS-type amplitude-modulating light modulator and with suitable linear polarisation of the incident light, there will be a transmittance profile which is proportional to the squared sine of twice the rotation angle 2φ.

Minimum transmittance is achieved for φ=0 degrees, and maximum transmittance is achieved for φ=+45 degrees or φ=−45 degrees. Ideally, a transmissive PSS-type amplitude-modulating light modulator uses a rotation angle range of between +45 degrees and −45 degrees. In that angular range, it would also be possible to use a reflective phase-modulating light modulator with rotatably arranged λ/2 plate and a fix λ/4 plate.

However, the useful range of rotation angles φ for PSS is limited by the tilting angle of the LC molecules in the smectic phases which are used for PSS (in particular smectic C). This tilting angle is a material-specific parameter which depends on the actually used liquid crystal substance and which also fluctuates with the temperature. Since nematic materials are frequently used in conventional LC displays, major LC manufacturers offer mostly nematic LC materials. The choice of commercially available smectic LC materials is much smaller.

This is why the angular range of between −45 degrees and +45 degrees can often not be realised with the available LC materials or only in small temperature ranges. For example, the achievable angular range is only −35 degrees to +35 degrees.

Another limitation can be that although an angle of 45 degrees can be obtained theoretically the voltage that is necessary to achieve such an angle is too high, i.e. it would exceed the range that is realisable with a conventional LC backplane.

The disadvantages of an angular range that is too small have differently strong effect on amplitude modulation and phase modulation. In the case of amplitude modulation, an angle of 35 degrees results for example in 88 percent of the maximum transmittance. This means that an amplitude-modulating display can also be operated with this angular range if the minor disadvantage of a slightly lower luminous efficacy and consequently a slightly higher power consumption of the display is accepted. In a reflective phase-modulating SLM, however, rotation angles of between −35 degrees and +35 degrees would only allow a maximum phase modulation of 1.55π instead of the required modulation of up to 2π.

If such a phase-modulating SLM is used in a holographic display device, this would have adverse effects on the quality of a holographic reconstruction. This represents a serious drawback.

Amplitude modulation with the IPS mode requires a rotation angle of between 0 and 45 degrees. This will effect a rotation of the linear polarised light by angles of between 0 and 90 degrees, which suffices to achieve either full transmittance or complete extinction with a fix polariser at the exit. Amplitude modulation with the PSS mode takes advantage of angles of between −45 degrees to +45 degrees, where positive and negative angles bring about same amplitudes.

Transferred to phase modulation, this angular range corresponds with phases of between 0 and π/2 (IPS) and 0 to π (PSS) in a transmissive phase-modulating light modulator or a reflective phase-modulating light modulator with an embodiment of the LCs as a rotatably arranged λ/4 plate. In order to achieve the desired phase modulation of up to 2π, the angle at which the LC molecules are aligned had to be enlarged, namely fourfold for IPS and doubled for PSS. This is hardly possible. The maximum rotation angle which can be achieved in a conventional IPS-type display is 90 degrees ±90 degrees would represent a theoretical limit for PSS, which is, however, never achieved in practice.

SUMMARY OF THE INVENTION

It is thus an object to provide a fast phase-modulating SLM with a modulation range of up to $2\pi$ whose available angular range of LC orientations is enlarged.

Publication [6] describes switchable surface alignment using a ferroelectric liquid-crystal polymer (FLCP).

Low-molecular liquid crystals are bonded chemically with a polysiloxane backbone such that they form mobile side chains of a polymer. The backbone gives this arrangement mechanical stability while the side chains can align in an electric field similar to low-molecular liquid crystals.

An LC cell is provided in that a polyimide layer is deposited onto glass substrates and treated by mechanical rubbing. The FLCP is applied by way of spin coating as an additional layer onto at least one substrate atop the polyimide, and it is also rubbed mechanically. Then, an LC material is filled between the two substrates. At the surface to the FLCP layer, the LC material aligns substantially parallel to the side chains of the FLCP. The side chains of the FLCP can be given a different orientation by applying an electric field. This changes the surface orientation of the LC material. Publication [6] describes that an alignment of the FLCP in an angular range of about −15 degrees to +15 degrees was proved empirically. These angles are analogously, i.e. continuously, variable depending on the applied voltage. If power is switched off, then the LCs will return to an orientation parallel to the rubbing direction. In that case, there will be no binary switching. The surface layer behaves like a V-shaped FLC instead.

Phase Deflector

In diffractive optical elements, such as phase deflectors, which are used in holographic display devices for observer tracking, the challenge is to realise a high diffraction efficiency. Such phase deflectors are described for example in documents DE 10 2009 028 626.8 and PCT/EP2010/058625, where they are called diffraction devices. Since phase deflectors will be discussed in more detail below, the disclosed content of documents DE 10 2009 028 626.8 and PCT/EP2010/058625 shall be included here in full.

In tracking devices, low diffraction efficiency will also lead to potential cross-talking of light to the other eye of the observer who looks at the display, because the light which is diffracted in a non-desired way can hit the eye of another observer. While this is less critical in single-user systems, because the two eyes of the observer always have a constant distance to each other so that cross-talking among them can be effectively prevented, cross-talking may cause limitations in particular in a multi-user system where the relative positions of the individual observers vary.

Light is for example deflected in a diffraction grating according to a linear rising or linear falling phase profile, depending on the direction of deflection. If the phase can only modulated modulo $2\pi$, the phase profile will show jumps back from $2\pi$ to 0 (flyback regions). The phase profile thus looks like a saw tooth, and in this particular case the saw tooth shape comprises a period of a substantially linear rising edge and an almost vertically falling edge. These regions are in practice not ideally sharp or vertically falling, but rather smoothened and sloped. The falling edge of the phase profile causes the diffraction efficiency to be reduced and thus potential cross-talking to increase. The loss in efficiency is the greater the smaller the grating period, because then the relative portion of the falling edge of the phase profile increases in relation to the rising edge. A smaller grating period corresponds with a larger deflection angle. This effect can be circumvented by using a polarisation grating (PG), which is also based on the phase modulation according to Pancharatnam. LC molecules in a LCPG rotate continuously over two grating periods by angles between 0 degrees and 360 degrees and so forth. This corresponds to a phase of between 0 and $4\pi$ across the two grating periods. Since there is no jump in the required LC orientation, the phase profile is not disturbed in the regions $2\pi$ to 0, i.e. it can be set as desired. Light can be diffracted at a high efficiency of almost 100%.

A tracking unit for tracking observer eyes requires a polarisation grating with variable period so to be able to vary the deflection angle by modifying the grating period. Conventional LCPGs are created by way of photo-alignment and have a fix period. A special type of polarisation gratings called V-COPA (see document US 2009/0073331 A1 and publication [5]) have a variable period which is controlled by an electric field. V-COPA uses LCs with negative dielectric anisotropy. Without the field, the molecules are substantially oriented at right angles to the surface. If an out-of-plane field is applied, then the molecules will align in the plane. By an additional in-plane difference of the voltages, the orientation in the plane can be defined and the grating period can thus be varied. However, with this type of polarisation grating, a surface orientation must be defined at selected positions at the distance of a given pitch of the diffraction grating, so that when applying an electric field a helical structure of the LC orientation is generated at all as is necessary for a polarisation grating. However, this defined surface orientation impedes the creation of a variable period of the polarisation grating when controlling it with the help of an electric field. This will bring about defects in the LC orientation compared with the desired polarisation grating.

Using the V-COPA as described in the literature, namely as phase deflector for tracking in holographic displays at high efficiency and little cross-talking is therefore impossible.

Other possible LC modes for polarisation gratings with a variable period would again include IPS and PSS, but only if the achievable rotation angle of the molecules is 180 degrees or optionally even 360 degrees. With these LC modes there is thus the same problem in a phase deflector as in a light modulator (SLM).

IPS/PSS phase-modulating SLM or phase deflectors, optionally transmissive with a rotatably arranged $\lambda/2$ plate or reflective with a rotatably arranged $\lambda/4$ plate according to this invention:

A pixel-wise (or stripe-wise) switchable or otherwise variable surface orientation of LC molecules in a pixelated SLM (or deflector with stripe electrodes) is used in combination with direct control of the LC molecules by an electric field for the purpose of enlarging the angular range of possible LC orientations by combining surface orientation and direct control of the LC molecules such that it exceeds a value that would be possible with a fix surface orientation, in order to enlarge the range of phase values that can be set in a phase-modulating SLM.

In particular, an angular range of the LC orientations of about 180 degrees is achieved with LC modes such as IPS or PSS by combining switchable or otherwise variable surface orientation and direct control of the LC molecules by an electric field, which allows a phase modulation of up to $2\pi$ to be realised.

This satisfies a major condition for the use of such LC modes in phase-modulating SLMs in a holographic display device or in phase deflectors with a high diffraction efficiency to be used as phase deflectors in a holographic single- or multi-user system. Any techniques for switching or otherwise varying the surface orientation which have been mentioned in the prior art may be used. Switching may preferably by realised by a dynamic surface layer which includes smectic liquid crystals itself.

An embodiment could be as follows: In a PSS-type display with LC orientation angles of up to ±45 degrees in the plane relative to a predetermined surface orientation, which are controlled by an electric field, would a switching of the surface orientation preferably by 90 degrees be added so that the controllable angle of 'surface 0 degrees plus field +45 degrees' ties in with the controllable angle of 'surface 90 degrees plus field −45 degrees'. When used as a phase modulator, the phases 0 to π would then for example be set by the surface orientation of 0 degrees and the relative orientation to the surface in the electric field of −45 degrees (phase 0) to +45 degrees (phase π). The phases π to 2π would be set by the surface orientation of 90 degrees and the relative orientation in the electric field of −45 degrees (phase π) to +45 degrees (phase 2π).

This is controlled by varying the electric field strengths and under consideration of threshold and saturation voltages. For example, the voltage required for switching the surface orientation should for example be higher than the saturation voltage of the PSS mode where the angles of +45 degrees or −45 degrees are formed. A binarily switchable surface orientation is required for this embodiment.

Depending on the actual configuration, the direction of the field used to define a certain surface orientation can generally also be chosen differently from that used to achieve direct control of the LC layer.

In an IPS-type display with an additional dynamic smectic surface LC layer, an out-of-plane electric field could for example switch the surface layer between two bistable states. The LC molecules are then controlled directly by an in-plane electric field.

In an IPS LC mode, the surface orientation will preferably be defined such that either (irrespective of the sign of the in-plane voltage) phases between 0 (maximum absolute voltage) and about π (no field) can be set for one surface orientation and phases between about π (no field) and 2π(maximum absolute voltage) can be set for the other surface orientation. In contrast to the PSS mode, the two required surface orientations only differ by a small relative angle in this embodiment. In the IPS mode, it is possible to use either a surface layer whose surface orientation can be switched binarily between two bistable states or a surface layer whose surface orientation varies continuously as the applied field changes.

This part of the invention will be described in more detail below with the help of FIGS. 1 to 6.

V-COPA Phase Deflector According to this Invention

The concept of a V-COPA is modified according to this invention such that instead of a fix surface orientation a surface orientation which can be controlled pixel-wise or stripe-wise such that it is switched between at least three possible states (i.e. at least tristable or continuously variable) is variably adapted to the grating period of the LCPG which actually needs to be set. Thereby, the generation of an LCPG of that period, which is realised through an electric field, is supported and defects in the LCPG, which would occur due to a fix surface orientation, are avoided or reduced.

The three states of surface orientation are for example as follows:

1. The surface orientation is defined such that the LC molecules are substantially oriented perpendicular to an electrode;
2. The surface orientation is defined such that the LC molecules are oriented at a first, slightly tilted angle relative to the surface normal;
3. The surface orientation is defined such that the LC molecules are oriented at a second slightly tilted angle relative to the surface normal, where the second angle is substantially tilted in the other direction and its absolute value is substantially the same as that of the first angle.

Generally, the surface orientation can be set such that the LC molecules (liquid crystals) are substantially aligned with a first predeterminable initial alignment in a first local region of the light modulator. In a second local region of the light modulator, the liquid crystals can be aligned by the alignment means with a second predeterminable initial alignment which is turned by a first angle in relation to the first initial alignment. In a third local region of the light modulator, the liquid crystals can be aligned by the alignment means with a third predeterminable initial alignment which is turned in relation to the first initial alignment by a second angle which has substantially the same absolute value as the first angle but which is tilted in the opposite direction, i.e. which has the opposite sign.

Here, the predeterminable first initial alignment of the liquid crystals could be substantially parallel or perpendicular to the surface normal of a substrate so that a V-COPA or IPS/PSS arrangement can be realised. Alternatively, the predeterminable first initial alignment of the liquid crystals could be substantially parallel or perpendicular to the longitudinal axis of substantially linear electrodes, so that an IPS arrangement can generally be realised.

In the IPS/PSS modes it is optionally also possible for an alignment layer (or alignment means) which shows binary behaviour to be switched between two initial alignments only, where these two initial alignments are for example turned symmetrically by angles of the same absolute value but which are oriented in opposite directions in relation to the longitudinal axis of substantially linear electrodes. This corresponds with the second and third initial alignment in the description above, while the above-mentioned first initial alignment, which would be parallel or perpendicular to the longitudinal axis of the electrodes, can be omitted when using an alignment layer with binary behaviour.

The surface orientations 2 and 3 are set at certain positions such that their distance corresponds roughly with a grating period of the LCPG. If the device is controlled pixel-wise, then the surface orientation according to setting 2 or 3 is set in the region affected by one electrode each. The orientation according to setting 1 is set by the other electrodes.

If the grating period corresponds exactly with an integer multiple of the electrode pitch, then the distance between positions 2 and 3 is identical to the grating period. If the grating period does not correspond exactly with an integer multiple of the electrode pitch, then the surface orientations 2 and 3 shall be set by the nearest electrodes.

For example, a grating period which is 3.5 times the electrode pitch can be set in that the surface orientations 2 and 3 are set at a distance of 3 and 4 pixels alternately, i.e. on average 3.5 pixels.

This part of the invention will be described in more detail below with the help of FIGS. 7 to 12.

Insofar, a light modulator according to the present invention serves in particular for the presentation of two- and/or three-dimensional image contents in a display. The light modulator comprises two opposing substrates and electrodes. At least one electrode can be provided either on just one or on both substrates. At least one liquid crystal layer is provided between the two substrates. An alignment means is provided on the surface of the substrate which faces the liquid crystal layer to set a predeterminable initial alignment of the liquid crystals. The orientation of the liquid crystals can be controlled in a predeterminable range—in particular as defined by a threshold field strength and a saturation field strength—through an electric field which is generated by the electrodes. The predeterminable initial alignment of the liquid crystals shall in particular be understood to be the above-mentioned preferred direction or preferred orientation of the LC molecules.

The alignment means is of a controllable type and can be controlled such that hereby the initial alignment of the liquid crystals is modified. If the initial alignment of the liquid crystals is modified, then the orientation of the liquid crystals in an electric field can be controlled such that the liquid crystals can be oriented outside the range that was defined by the previous predeterminable initial alignment. The orientation of the liquid crystals outside the predeterminable range represents in particular a continuation of the previous orientation or direction of rotation which was possible in the given range of the liquid crystals at the predeterminable initial alignment. Now, if a liquid crystal can be turned and aligned in the predeterminable range in a plane, this liquid crystal can be turned and aligned in an extended range in this plane if its initial alignment is modified.

In particular if the liquid crystals can arbitrarily turn and align in two opposite directions of rotation when an electric field is applied, then it could be provided that the alignment means is of a controllable type and can be controlled such that thereby the initial alignment of the liquid crystals is modified. If the initial alignment of the liquid crystals is modified, then the orientation of the liquid crystals can be controlled by an electric field such that the liquid crystals can turn in a deterministic way, i.e. only in one direction of rotation.

In the case of PG, the alignment means could be of a controllable type and be controlled such that thereby the initial alignment of the liquid crystals is controlled in a predeterminable way in dependence on the location, preferably through at least two regions with electrodes.

The present invention further relates to a display, in particular to a stereoscopic or holographic display which is characterised by a light modulator according to one of claims 1 to 15. The present invention further relates to a method of operating a light modulator according to one of claims 1 to 15. The method according to this invention comprises the following process steps:

a) Setting of at least one predeterminable orientation of the liquid crystals and, as the case may be, definition of at least one predeterminable initial alignment of the liquid crystals with the help of the alignment means b) Setting of an orientation that differs from the predeterminable orientation of the liquid crystals c) If the orientation that differs from the predeterminable orientation of the liquid crystals lies outside the given range of liquid crystal orientations, setting of a predeterminable initial alignment of the liquid crystals with the help of the alignment means such that the orientation that differs from the predeterminable orientation of the liquid crystals can be set.

Reflective phase-modulating light modulator according to this invention with a rotatably arranged λ/2 plate:

According to this invention, a reflective PSS-mode phase-modulating light modulator is designed as an optical component which comprises an optical unit which realises the function of a variable or rotatable λ/2 plate. The optical component further comprises on its backside a fix λ/4 layer and a reflective layer. An angular range of the rotation of the axes of the LC molecules of at least ±45 degrees is achieved by controlling the optical unit, namely by combining direct control of the PSS molecules and variable surface orientation, which is also controlled with the help of an electric field. This preferably allows the use of already commercially available smectic liquid crystal materials for the PSS mode and already proven angular ranges for switchable surface orientations. Here, a surface orientation which varies in analogy with the electric field is preferably used.

Insofar, the light modulator could be operated in a reflective mode where the liquid crystal layer realises the function of a variable λ/2 plate. Circular polarised light to be modulated passes through the liquid crystal layer and a λ/4 plate which is disposed downstream of the liquid crystal layer and is reflected by a reflective layer and passes through the λ/4 plate and through the liquid crystal layer again. Alternatively, the light modulator could be operated in a reflective mode where the liquid crystal layer realises the function of a variable λ/4 plate. Circular polarised light to be modulated passes through the liquid crystal layer and is reflected by a reflective layer and passes through the liquid crystal layer again.

A phase-modulating light modulator preferably comprises regularly arranged pixels, where the pixels are made such to modulate—in particular continuously—the phase of the light which interacts with the light modulator. Here, a pixel modulates the light which interacts with the pixel substantially in the same way across the entire cross section of the pixel. For example, a pixel could be one of the rectangles shown in FIG. 2, which are here shown in a greatly magnified manner and which only represent a tiny detail of a light modulator.

By applying electric fields of locally different strength and/or direction, the liquid crystals can be oriented in a predeterminable way such that a continuous angular distribution of the liquid crystals between 0 and 360 degrees can be achieved in relation to the initial alignment with a variably controllable grating period.

The following embodiments can be combined with any already described transmissive or reflective phase-modulating SLMs or phase deflectors.

In a particular embodiment of the invention, a temperature calibration is provided:

The elastic parameters of an LC material vary for example as the temperature fluctuates. Since the overall orientation which results from a combination of elastic interaction among the molecules as well as surface and field portions, the rotation angle of the molecule typically varies as the temperature changes while the electric voltage is kept constant. As the temperature rises, the angle frequently becomes larger, given a continuous voltage. However, this depends on the molecule. The mobility does therefore not necessarily increase as the temperature rises, even though this is usually the case.

The change in the resilience or deflection angle which occurs as the temperature fluctuates is reversible and can be calibrated. This calibration is preferably be stored in a look-up table (LUT).

At least one temperature sensor is provided in the phase-modulating light modulator so to be able to consider the temperature calibration. It is possible to provide a matrix of temperature sensors so to be able to measure temperatures locally.

As the case may be, the maximum rotation angle can vary as the temperature changes, it can for example decrease as the temperature rises. If the phase-modulating light modulator is intended to be run in a defined operation temperature range, then the smectic LC and the FLCP and the used voltages are chosen such that an angle of 45 degrees is always achieved, even at the temperature within the operation temperature range which is related to the minimum angle.

In a particular embodiment of the invention, several measures to compensate ageing of the device are provided.

An UV filter which is disposed in front of the display serves to reduce chemical ageing of the materials of the display as it widely prevents chemical bonds from breaking up which is caused by the high photon energy of the UV radiation. The chemical bonds will remain stable. A firm chemical bond of the FLC molecules also prevents in particular an undesired mixing of these molecules in the switchable surface orientation layer with the LC molecules in the PSS LC layer.

The above cited prior art takes advantage of an FLCP in the form of a polysiloxane with FLC side chains. However, this has the drawback that it requires an additional layer to be deposited in the LC cell.

It is thus proposed to directly bond the FLC molecules chemically with a polyimide, which is a material which is already used for surface alignment in the LC cell. Chemical bonding of the FLCs to the polyimide alignment layer can be achieved by attaching a functional group to the FLCs where the functional group is bonded to the FLCs on the one hand and to the molecules of the polyimide alignment layer on the other.

Generally, using a FLCP is only one possibility of realising a switchable surface alignment. Another possibility of realising a switchable surface alignment which is proposed here is to use carbon nanotubes (CNT). CNT can also be bonded chemically with suitable functional groups. The possibility of attaching various functional groups to CNT is described in the literature. This can specifically be used in this context. It is further also possible to attach two functional groups to the FLC or CNT, where one provides a chemical bond to the alignment layer and the other one provides a chemical bond to the LC material. These two functional groups can be specific, so that it is circumvented that the FLC or CNT are "stapled" to the alignment layer on either side.

Other molecules diffusing into the LC layer may also have an adverse effect, e.g. in the form of an ageing process. Short-chained CH molecules (and plasticisers) diffuse into the LC. However, the diffusion coefficient depends on the LC material and can be chosen such that the diffusion into the LC material is minimised in the actual material combination. Short-chained CH molecules can be added to the alignment layer in a higher concentration in order to compensate the diffusion which takes place until a diffusion equilibrium is attained. Sealing, which is also required for the LC layer, shall be performed such that the seal also represents a diffusion blockage for the present short-chained molecules.

BRIEF DESCRIPTION OF THE DRAWINGS

Generally preferred physical forms and continuations of the teaching will be explained in conjunction with the description of the preferred embodiments of the invention and the accompanying drawings. The Figures are schematic drawings, where FIG. 3 illustrates the principle of phase modulation with circular polarised light according to the prior art, FIG. 7a is a front view which shows a detail of a conventional phase deflector, which has VA LC in this example, FIG. 7b is a diagrammatic view which illustrates the resultant phase profile when the LC molecules are oriented as shown in FIG. 7a, FIG. 8a is a front view which shows a detail of a conventional LCPG for phase modulation of circular polarised light, FIG. 8b is a diagrammatic view which illustrates the resultant phase profile when the LC molecules are oriented as shown in FIG. 8a, FIG. 9 is a front view which shows a detail of a conventional V-COPA during the absence of an electric field, FIGS. 14 and 15 are front views showing a further embodiment of the present invention.

DETAILED DESCRIPTION OF THE INVENTION

Figure 1:
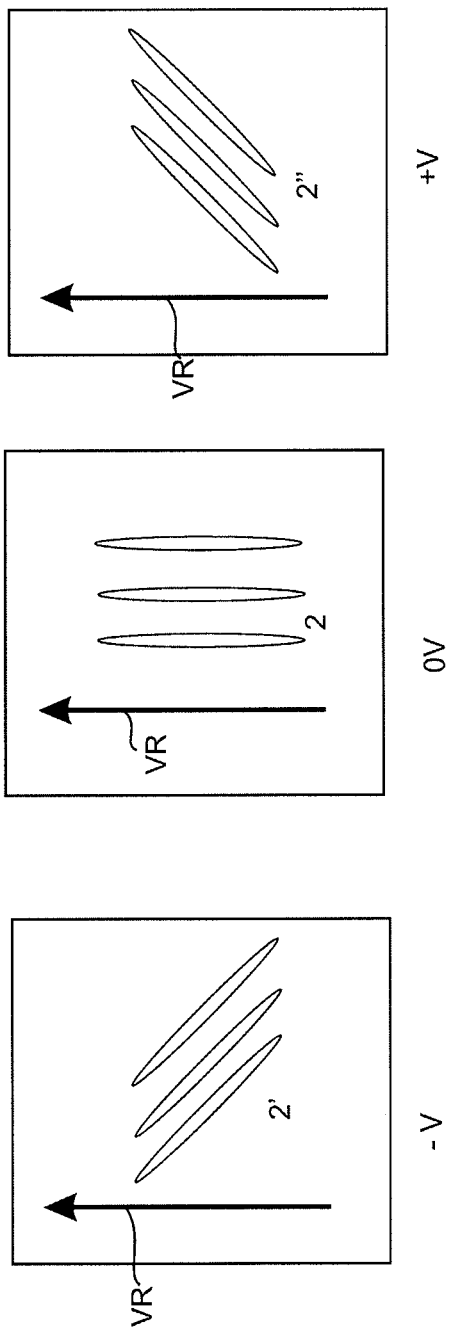
FIG. 1 is a front view (i.e. the typical view of an observer towards the display panel and in line with the surface normal of the substrate) which shows the orientations of the PSS LC molecules when different voltages are applied, representing the prior art.

FIG. 1 shows a detail of a prior art PSS LC display with a fixed or unchanging preferred orientation of the LCs as defined by the surface alignment. This preferred orientation is indicated by the arrow VR. If no voltage is applied, i.e. if U=0 V, which is shown in the middle in the diagram, then the LC molecules will align parallel to this preferred orientation VR. If a voltage which exceeds a certain threshold is applied perpendicular to the drawing plane, then the molecules will rotate relative to this direction, where the direction of rotation depends on the sign of the voltage and where the rotation angle depends on the absolute voltage. Above a voltage saturation value, a fix maximum rotation angle is attained. In an LCD which serves to modulate the amplitude of the light, this angle typically lies somewhere around ±45 degrees. The direction of polarisation of the incident light is not shown in the drawing. An amplitude modulation would be realised with linear polarised light, and a phase modulation would be realised with circular polarised light. Phase values between 0 and π would then have to be set to achieve a rotation angle range of between −45 degrees and +45 degrees.

Figure 2:
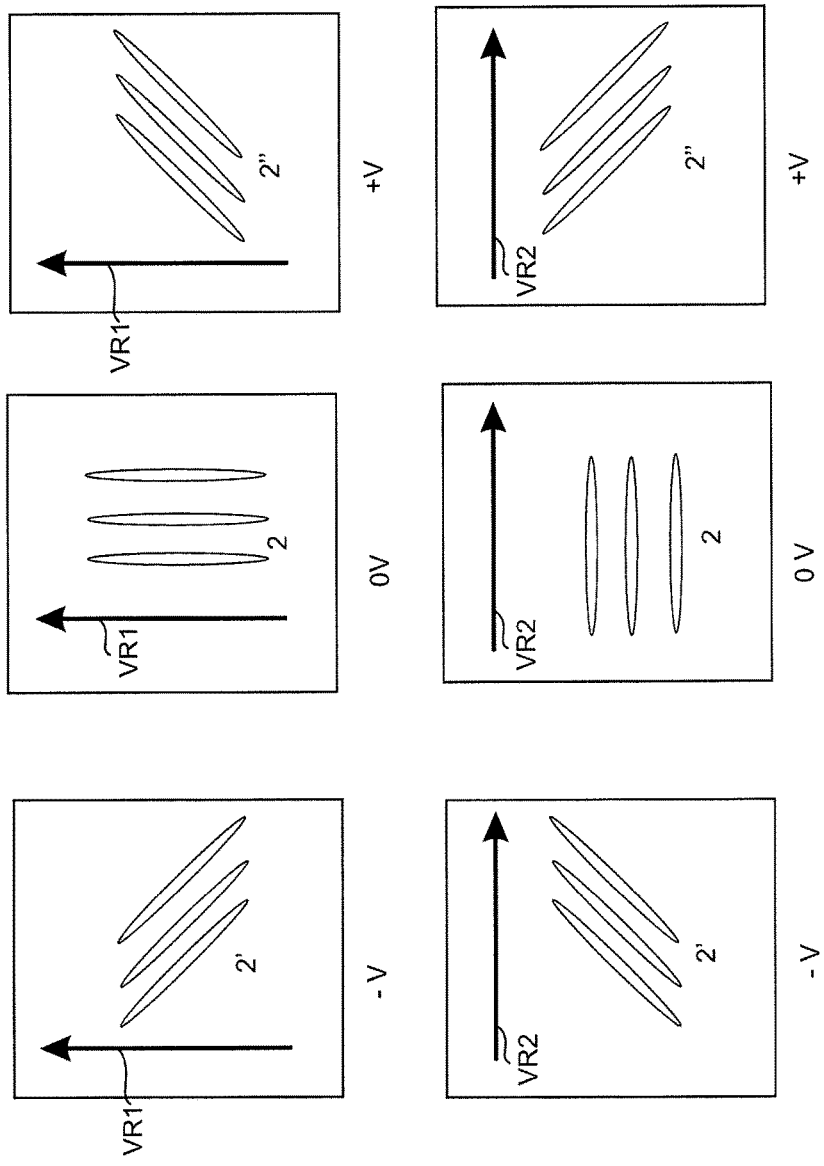
FIG. 2 is a front view which shows (in a simplified manner) a detail of a first embodiment of the present invention, where the PSS LC molecules cannot only be oriented in an angular range of altogether 90 degrees (−45 degrees to +45 degrees) as in FIG. 1, but rather in an angular range of altogether 180 degrees, thanks to a surface orientation which can be switched binarily by 90 degrees.

FIG. 2 shows a detail of a PSS LC display according to this invention with binarily switchable surface orientation. One preferred orientation VR1 of surface alignment can be switched to another preferred orientation VR2. If no field is applied (top middle and bottom middle), then the LC molecules will align parallel to one of these preferred orientations VR1 or VR2. If a field is applied, then they will align at a corresponding angle relative to these preferred orientations VR1 and VR2, respectively.

In the present example, the angle of VR1 and VR2 is 90 degrees. This means that the orientation of the LCs which is attained if the preferred surface orientation VR1 is active and if maximum positive voltage is applied (0 degrees+45 degrees, as illustrated in the diagram in the top right corner) corresponds with that if the preferred surface orientation VR2 is active and if maximum negative voltage is applied (90 degrees−45 degrees, as illustrated in the diagram in the bottom left corner). Generally, the orientation of the LC molecules can be varied in an angular range of 180 degrees by combining a certain surface orientation and a certain electric field. This angular range is sufficient for a phase modulation in a range of between 0 and 2π.

The surface orientation can for example be set by applying a short voltage pulse to a bistable surface layer, and the direct control of the bulk LC can be performed sequentially.

FIG. 3 illustrates once more the general principle of the phase modulation according to Pancharatnam [4]. Circular polarised light falls on a λ/2 plate. The direction of rotation of the circular polarised light changes. In addition, a phase occurs which depends on the angle of the optical axis of the λ/2 plate in the plane. If the optical axis is turned by the angle φ (illustration on the right hand side in FIG. 3), then the phase at the exit will change by the angle 2φ.

Figure 4:
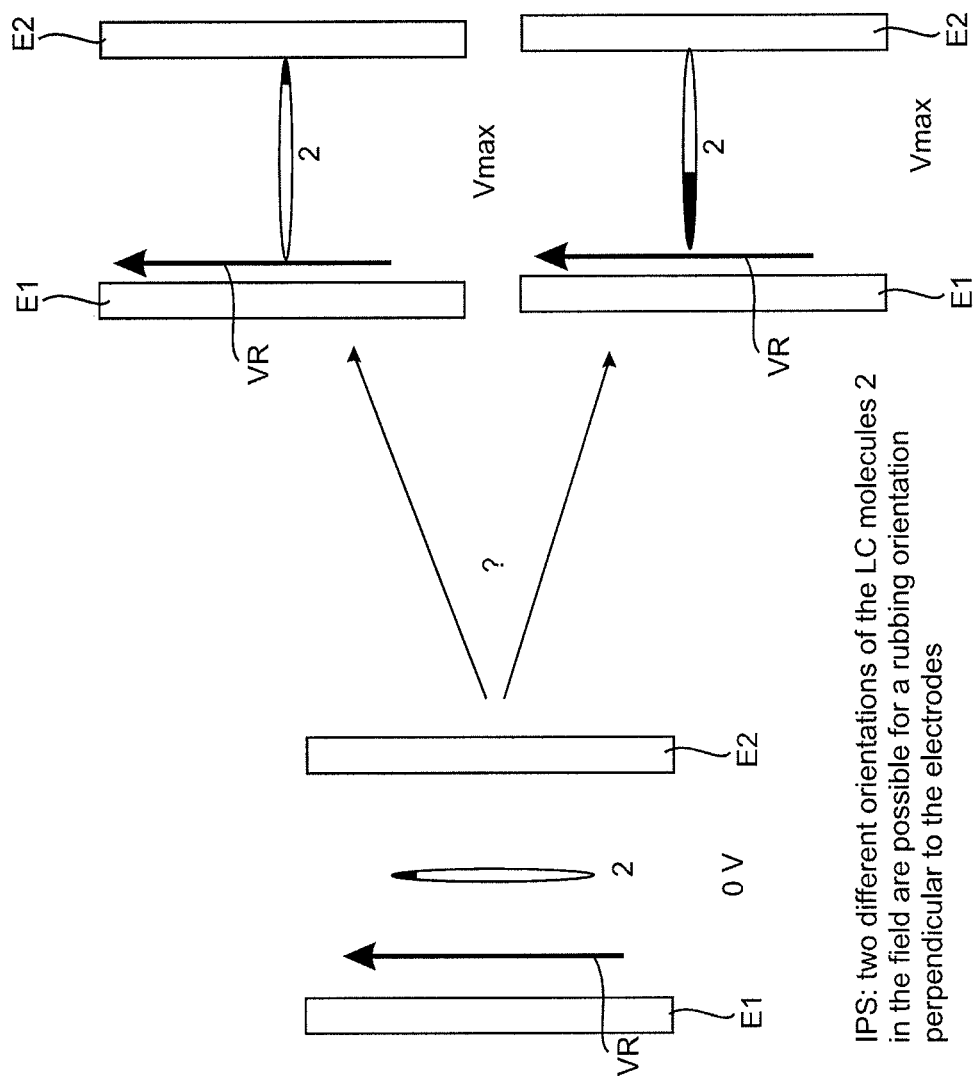
FIG. 4 is a front view which shows a detail of an IPS-mode display, namely the orientation of the molecules if no electric field is applied on left and the orientation of the molecules if an electric field is applied which is generated by the absolute voltages Vmax in the top right and bottom right drawings.

FIG. 4 shows schematically a detail of a pixel of a prior art IPS-mode LCD with two in-plane electrodes E1, E2, which can generate an electric field in the drawing plane. In this example, the given surface orientation VR is exactly 90 degrees relative to the direction of the field. In such an arrangement, clockwise and counter-clockwise rotation of the molecules in the field is energetically equal. It is thus possible that domains with different orientations will form, namely the orientations shown in the top right and bottom right part of the drawing.

Figure 5:
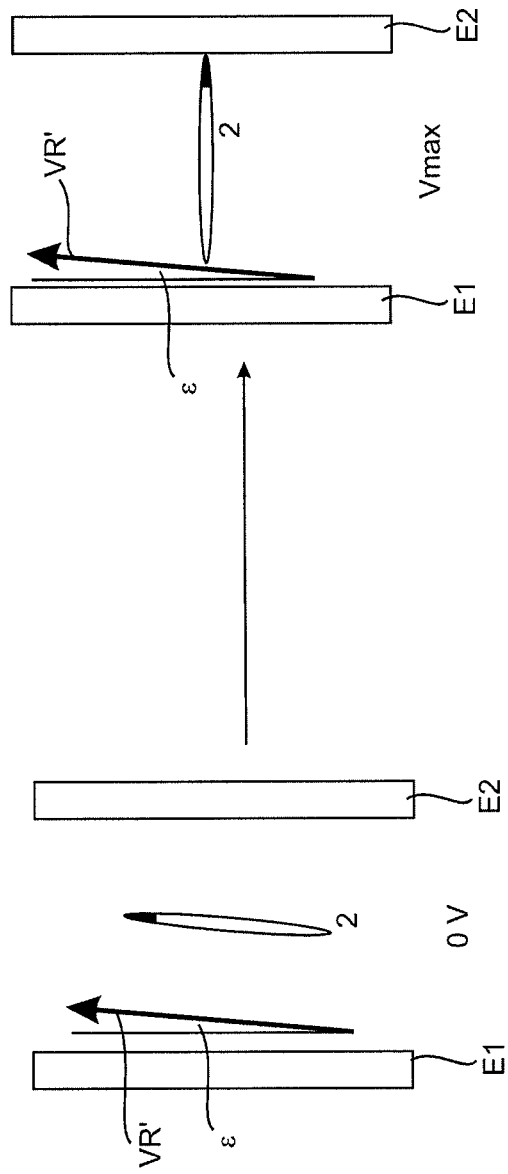
FIG. 5 is a front view which shows an arrangement which compares to that in FIG. 4, but where the initial alignment of the LC molecules is slightly turned relative to the electrode arrangement.

FIG. 5 shows schematically a detail of a pixel of a prior art IPS-mode LCD where the surface orientation VR' deviates by a small angle (initial alignment) from 90 degrees relative to the orientation of the electric field. This initial alignment energetically favours a clockwise rotation of the molecules. As can be seen from FIG. 5, an IPS cell is only capable of realising a maximum rotation angle of near 90 degrees, because the LC molecules can only align in a range of between the surface orientation and the orientation parallel to the field. However, 45 degrees are typically already sufficient for amplitude modulation.

Figure 6:
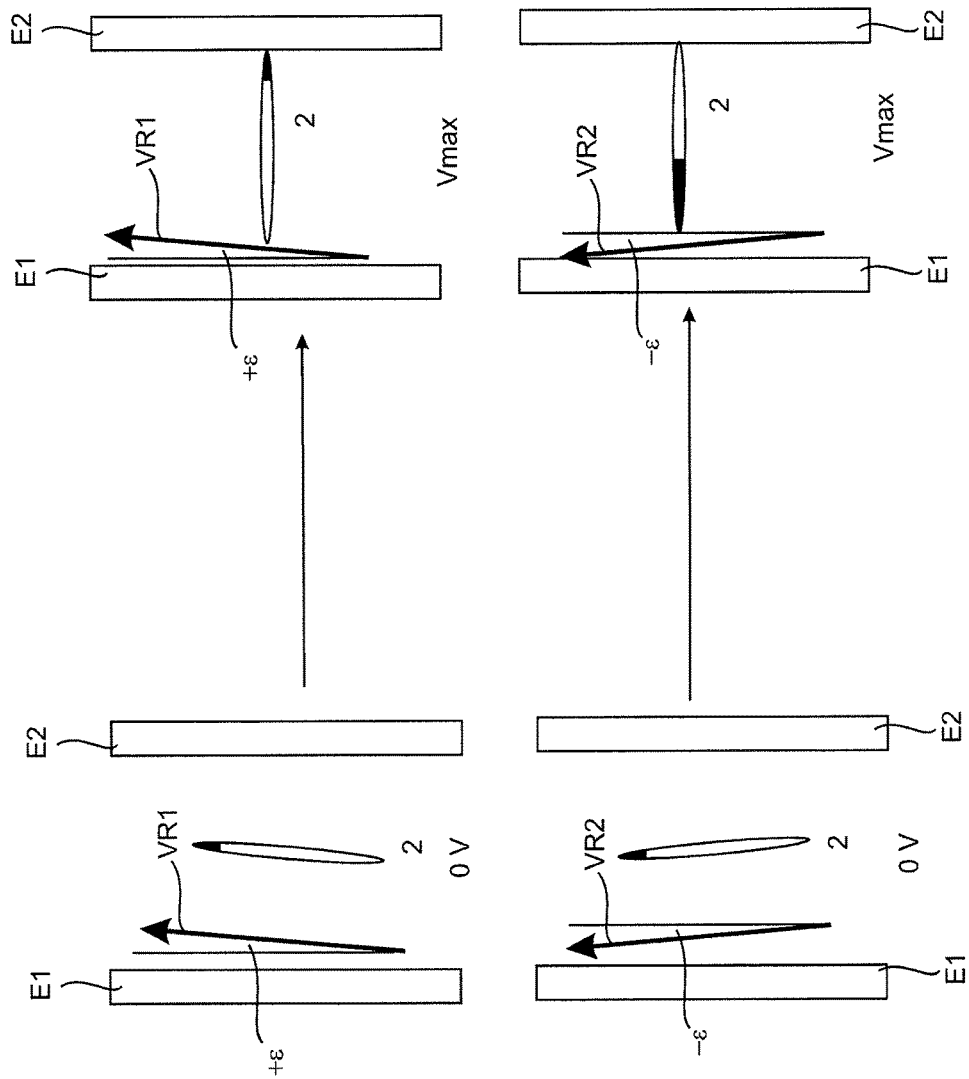
FIG. 6 is a front view which shows an arrangement which compares to that in FIG. 5, where here in a further embodiment of the present invention the direction of rotation of the LC molecules can be specified due to a binarily switchable or continuously variable initial alignment.

FIG. 6 shows schematically a detail of a pixel of an IPS-mode display with switchable surface orientations VR1 and VR2. The orientation is switched by a small angle around the direction normal to the electric field. If the surface orientation VR1 is active, then the clockwise direction of rotation of the LC molecules is preferred if an electric field is applied. If the surface orientation VR2 is active, then the counter-clockwise direction of rotation of the LC molecules is preferred if an electric field is applied.

It is for example possible in this context to take advantage of a surface layer which shows a binary behaviour, i.e. which switches between the two initial alignment conditions with angles of −ε and +ε relative to the electrode surfaces.

This allows the angular range of between −90 degrees and −ε, and the angular range of between +ε and +90 degrees to be realised, where ε is the angle to the normal of the electric fields in the preferred orientations VR1 and VR2. These angles can be very small, for example ranging between 2 and 5 degrees. This allows a phase modulation of between 0 and 2π with the exception of the small gap around π. In a phase deflector, the LC orientation is also affected by the neighbouring LC molecules, so that a continuous helix of LC orientations will form there, whereby said gap will be closed.

Alternatively, a surface layer can be used whose initial alignment can be changed continuously in an angular range of between −ε and +ε. Then, a first initial alignment (without applied field) can be parallel to the electrodes. Small angles of the LC relative to the electrode, namely between −ε and +ε, can only be achieved by setting the initial alignment of the surface layer. The angular range of between −90 degrees and −ε, and the angular range of between +ε and +90 degrees is realised—as in the binary case—in that the initial alignment of the surface layer is set to + or −ε and that the LC is additionally directly controlled through an in-plane field.

FIG. 7a shows a conventional phase deflector, which comprises a VA-mode LC in this example. A phase modulation of between 0 and 2π is realised by turning the LCs out of the drawing plane (the drawing shows the projection of the LCs into the drawing plane—the shorter they are the more are they turned out of this plane).

FIG. 7b illustrates the resulting phase profile. At the point of transition from 2π to 0, there should be a jump in the LC orientation by 90 degrees in order to be able to modulate the phase φ as desired. However, since the elastic forces between the LC molecules do not permit such jump in orientation, there will be a smoothening effect, indicated by black-striped LC molecules in the drawing. A decreasing edge AA (flyback region) occurs in the phase profile. In a holographic display, the light is not deflected as desired in this flyback region. The diffraction efficiency is reduced and undesired cross-talking into a different observer eye may occur.

FIG. 8 shows a prior art LCPG, which is based on the modulation of circular polarised light. A rotation of the LC molecules by 180 degrees (see FIG. 8a) corresponds with a phase of 2π(see FIG. 8b). Since the LC molecules keep on rotating continuously, there will be no defect in the phase profile at the 2π/0 transition points (see FIG. 8b). Conventional LCPG have a fix grating period, which is defined by one-off optically induced alignment. Although it would generally be possible to use an optically addressed variable LCPG in a holographic display, it would not be able to achieve the required response times.

FIG. 9 shows a prior art V-COPA. An LCPG is formed partly by applying an electric field there. However, a predeterminable surface orientation would still be necessary for an LCPG to be generated in the field.

FIG. 9 shows the orientation of the molecules during the absence of an electric field. This orientation is chiefly at right angles to the drawing plane. At certain positions, however, the LC molecules are slightly tilted upwards (1') or downwards (1") caused by their surface orientation relative to the surface normal. At the other positions, they can be oriented exactly perpendicular to the surface of the substrate (1).

Figure 10:
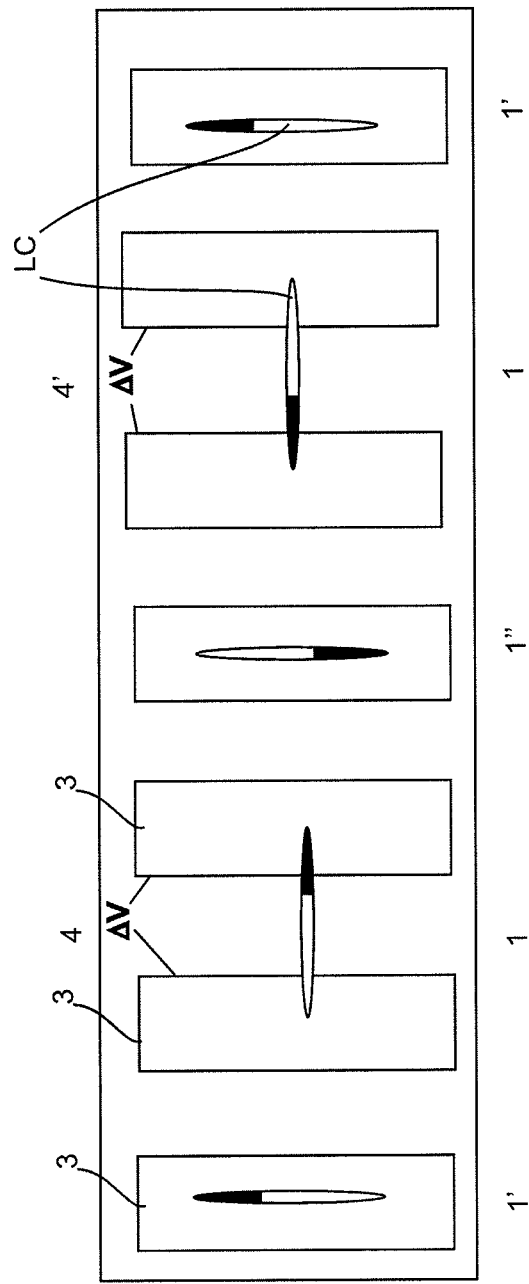
FIG. 10 is a front view which shows the V-COPA of FIG. 9 during the presence of an electric field, and with LC molecules which are aligned according to a suitable period.

FIG. 10 shows a prior art V-COPA. Here, the molecules comprise a negative dielectric anisotropy. FIG. 10 shows the orientation of the molecules in the electric field for one grating period. The molecules are turned into the drawing plane by an out-of-plane field. However, to achieve a certain orientation in this plane, a continuous rotation in a range of between 0 and 360 degrees must be achieved. This means that a variable orientation must be realised in this plane depending on the actual grating period. This is achieved partly by applying an additional in-plane field, for example at the positions 4 and 4'. However, the orientation at the positions 1' and 1" is first set by previous tilting according to the surface orientation in the no-field condition. A continuous rotation will occur between these positions (e.g. left between 1' and 4) caused by elastic forces.

Figure 11:
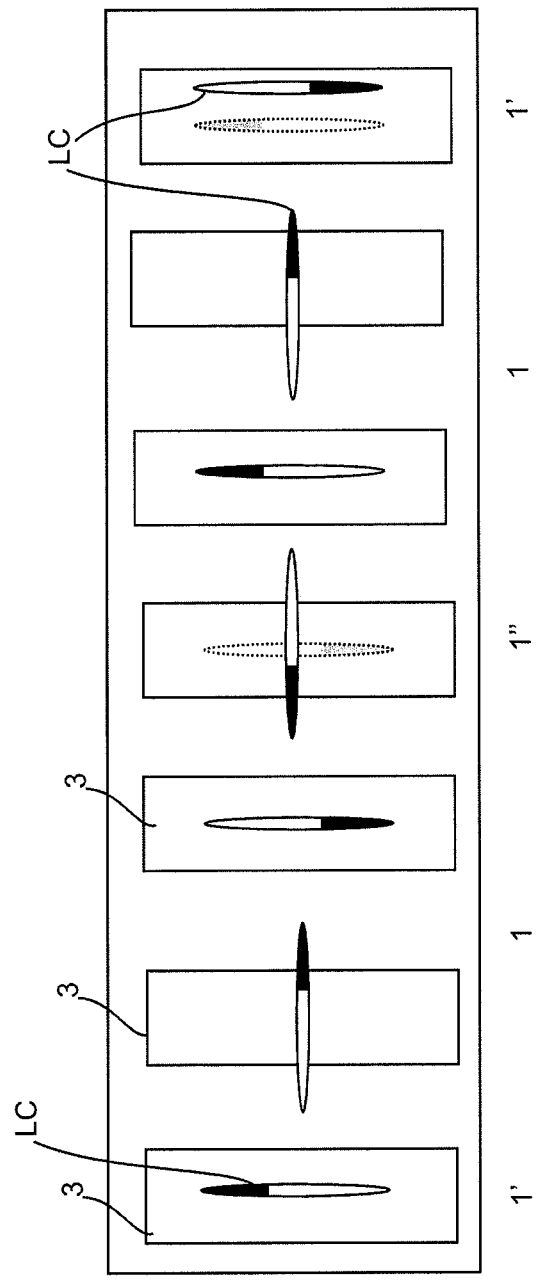
FIG. 11 is a front view which shows the V-COPA of FIG. 9 during the presence of an electric field, and with LC molecules which are aligned according to a non-suitable period.

FIG. 11 illustrates the problem which emerges when the grating period of a prior art V-COPA is varied. At several positions, there will be a conflict between the alignment which is defined by the surface orientation (dotted/light grey) and the orientation which is necessary for the grating period. This is why a phase profile with changed period can only be generated locally. Seen globally, there will be defects.

Figure 12:
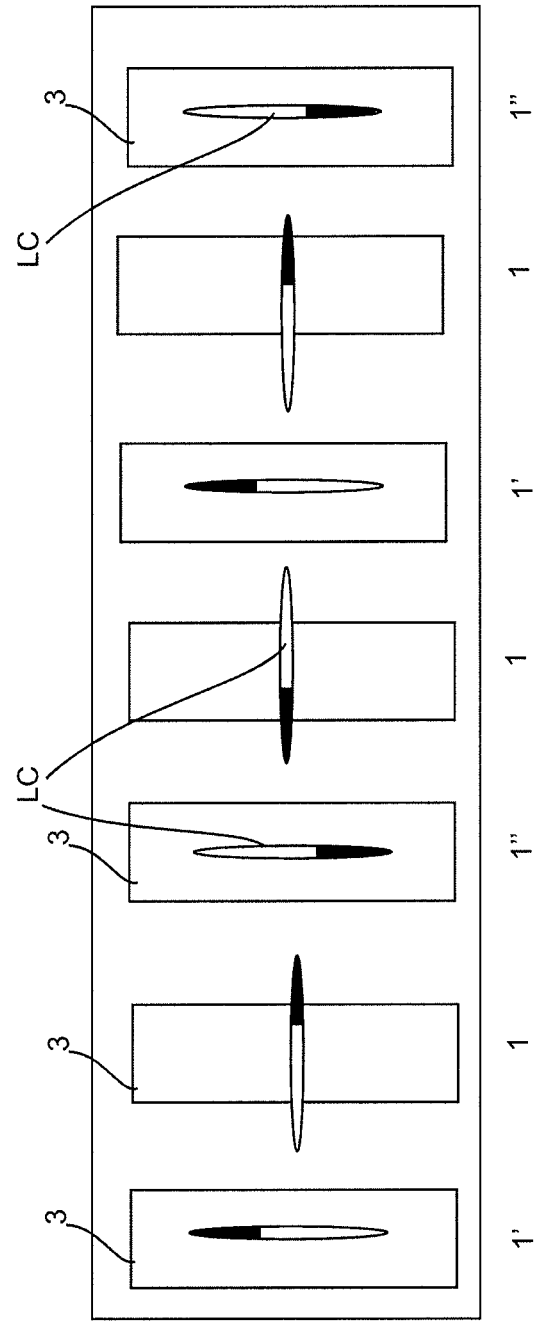
FIG. 12 is a front view which illustrates another embodiment of the present invention in the form of a detail of a V-COPA with a controllable surface orientation during the presence of an electric field, and with LC molecules which are aligned according to a surface orientation which is adapted to the period.

FIG. 12 illustrates the solution of this problem according to the present invention. The surface alignment can be matched to the actual grating period by way of pixel-wise switching between the three surface orientations 1, 1' and 1". This way, the conflict shown in FIG. 11 can be circumvented and a global change in the grating period becomes possible without defects. Such a V-COPA which is modified according to this invention is suitable for observer tracking in holographic displays.

As described above, in an LC which is controlled by an in-plane electric field, the orientation of the long axes of the LC molecules can be set in an angular range of up to 180 degrees in combination with a controllable surface orientation of the LC. Thanks to this controllable angular range, it is possible to realise a variable polarisation grating with the help of such an electrode arrangement.

Now, further embodiments will be described which focus on details of the required electrode arrangements and control of the LC molecules.

Figure 13:
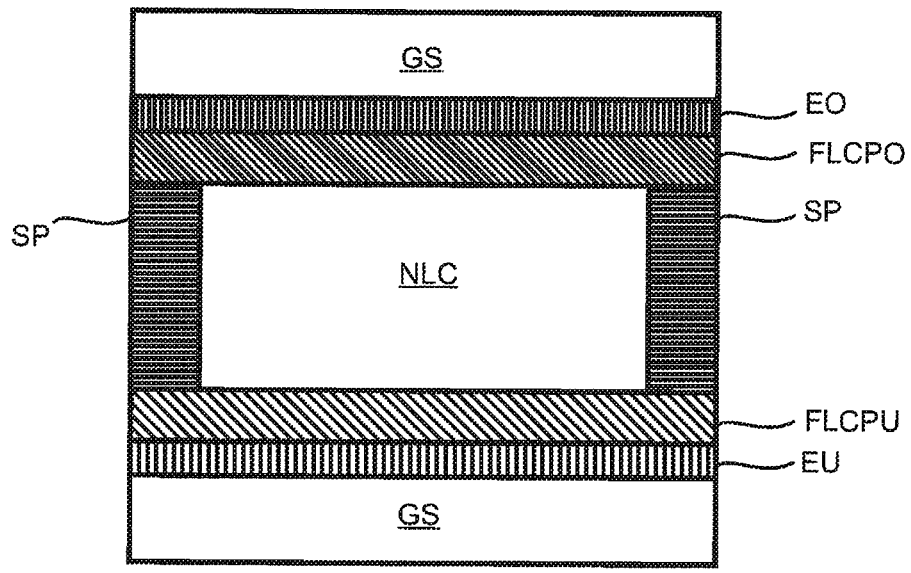
FIG. 13 is a sectional view which shows an LC cell as known in the prior art.

FIG. 13 illustrates the prior art according to [6] and shows a section through an LC cell which comprises two glass substrates GS which are arranged at a distance defined by spacers SP, where the inner surfaces of the two glass substrates are covered with plane electrodes EO and EU and with controllable surface alignment layers or alignment means FLCPO and FLCPU. A layer NLC with a nematic LC is disposed between the controllable alignment means. The controllable alignment means EO, EU here consist of a ferroelectric liquid crystal polymer (FLCP).

Here, the two alignment means FLCPO, FLCPU are controlled through an out-of-plane field between the two plane electrodes EO, EU. The nematic LC itself is only controlled indirectly through its interaction with the alignment means FLCPO, FLCPU, and not directly such as by an electric field.

FIG. 14 shows schematically another embodiment of the present invention in the form of a variably controllable polarisation grating. It has a layer structure which compares to that illustrated in FIG. 13. FIG. 14 is a front view, so that the layer structure is not shown in this Figure. In contrast to FIG. 13, however, this embodiment does not feature a plane electrode, but rather striped and individually controllable electrodes E1 to En, which are indicated as rectangular boxes and of which only a few are shown in the longitudinal direction here in the drawing. The electrodes E1 to En are applied to either glass substrate. The electrodes E1 to En on the upper and lower glass substrates lie one above the other (congruent) and are thus not shown separately in the front view. The electrodes E1 to En are made of a transparent material or have a transparent design, at least for the light used, they are for example made of indium tin oxide (ITO).

The LC orientation is defined according to the principle shown in FIGS. 5 and 6 by a combination of out-of-plane fields with which the switchable initial alignment is set, i.e. with which the direction of rotation of the LC molecules is set to clockwise or counter-clockwise, and in-plane fields with which the desired rotation angle of the LC molecules is eventually realised. In addition, elastic forces also apply among the individual LC molecules, so that in the lateral direction a rotation angle of the LC molecules can be set which changes continuously with the position.

FIG. 14a shows an initial homogeneous orientation of the LC molecules without an electric field as induced by a certain surface orientation. This condition represents the surface orientation without an electric field. In the case of a continuously variable surface orientation as controlled by an electric field, as shown here, the surface orientation without electric field is preferably chosen to be parallel to the electrodes E1 to En. In the case of a binarily switchable surface orientation (which will remain unchanged when the electric field is switched off), the LC molecules can also be in one of these switching states without field, i.e. they can also show a small angle relative to the longitudinal axis of the electrodes E1 to En.

FIG. 14b illustrates how a initial alignment which is suitable to control a polarisation grating can be generated by controlling the switchable alignment means. An out-of-plane field is applied between corresponding electrodes E1 to En on the upper and lower substrate. The switchable alignment means gives the LC molecules at the surface a small clockwise or counter-clockwise initial alignment, depending on the sign of the voltage. In a polarisation grating, a rotation of the LC molecules by 180 degrees is required within one grating period, i.e. a clockwise rotation for half a grating period and a counter-clockwise rotation for the other half grating period, starting from the zero position. FIG. 14b shows an example in which the grating period to be set precisely corresponds with the fourfold electrode distance.

Generally, however, the grating period does not necessarily have to be an integer multiple of the electrode distance.

Here, a positive out-of-plane voltage is applied to two electrodes (i.e. upper electrode on '+', indicated as O+), and a negative out-of-plane voltage is applied to the following two electrodes (i.e. upper electrode on '−', indicated as O−). The alignment means is thereby controlled or switched, and the LC molecules are tilted accordingly clockwise or counter-clockwise by a small angle. The molecules which lie between the electrodes are also moved through the elastic forces among the LC molecules.

FIG. 14c shows the orientation of the LCs after having eventually applied an in-plane electric field in order to create the polarisation grating in the LC layer. An in-plane field of variable strength, which depends on the required local rotation angle, is applied between two adjacent electrodes on the same substrate (schematically indicated in FIG. 14c with I++ for a strong electric field, I+ for a medium electric field and I0 for no electric field). A strong in-plane field I++ results in a rotation of the LC molecules of up to 90 degrees, a weaker field 1+ in an accordingly smaller rotation. The in-plane field directly affects the LC molecules between the electrodes. Thanks to the elastic forces, the molecules which lie directly under the electrodes E1 to En are moved as well. The sign of the in-plane field can be chosen freely, because it does not affect the direction of rotation of the alignment. The latter is merely defined by the small initial alignment shown in FIG. 14b.

What has been described above represents one possible embodiment, which, however, has some disadvantages. In particular, the out-of-plane fields which serve to switch the alignment means can also affect the LC molecules themselves such that the latter are not only tilted, but additionally turned out of the plane, which would disturb the process.

FIG. 15 thus shows an embodiment which involves LC molecules with negative dielectric anisotropy, which align at right angles to the field. Here, the surface orientation is chosen to be perpendicular to the long axis of the substantially linear electrodes E1 to En, see FIG. 15a. An alignment means, which is again switched by an out-of-plane field, defines the direction of rotation to be clockwise or counter-clockwise, see FIG. 15b. Because of their tendency to align perpendicular to the field, there is no risk here that the LC molecules are turned out of the plane by the field. FIG. 15c shows the situation when the polarisation grating is active.

Nevertheless, these embodiments have the disadvantage that the in-plane and out-of-plane fields which are to be applied can interact and disturb each other's desired effects.

Figure 16:
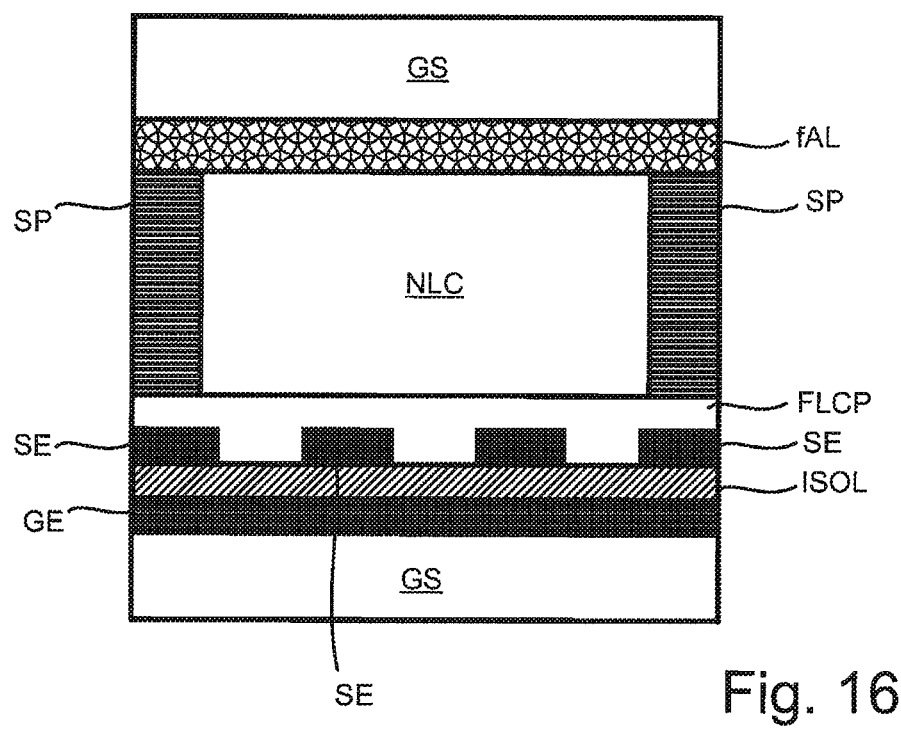
FIG. 16 is a sectional view which shows an LC cell as known in the prior art with a fringe-field (FFS) electrode arrangement and with a switchable alignment means.

FIG. 16 shows a switchable alignment means with a fringe field (FFS) electrode arrangement as known in the prior art. This type of arrangement is chosen in the cited document which represents the prior art because only lower voltages are required to control the alignment means. The lower substrate GS is covered with a base electrode GE and, atop of that, an insulating layer ISOL and stripe electrodes SE. The upper substrate GS has a fix alignment layer fAL. The out-of-plane field between the base electrode GE and the stripe electrodes SE continues beyond to include the switchable alignment means FLCP. According to the prior art, the alignment means FLCP is switched homogeneously across the entire area of a pixel.

Figure 17:
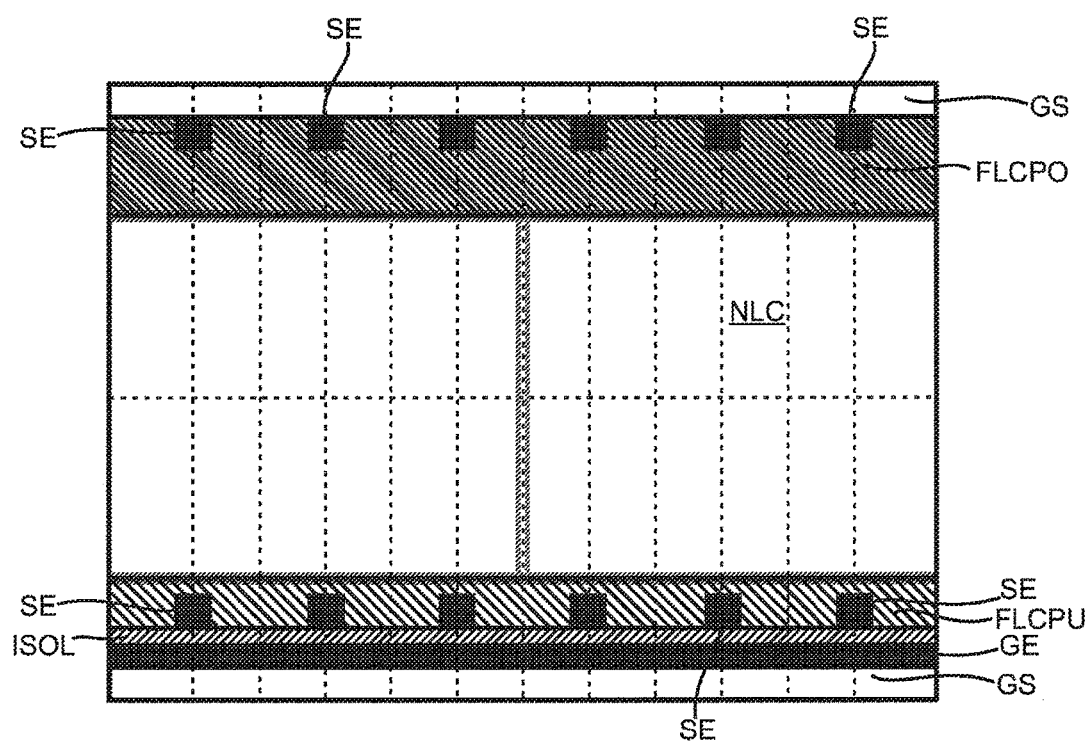
FIG. 17 is a sectional view which shows a further embodiment of the present invention.

FIG. 17 shows an embodiment with a plane electrode GE and—very much in contrast to a conventional fringe field—individually controllable stripe electrodes SE, here applied on either substrate GS. However, the in-plane electrodes SE may optionally be disposed on one substrate GS only. Here, advantage is preferably taken of the fact that the out-of-plane field does not extend very far into the LC layer NLC, so that it does not have a disturbing effect there. The in-plane field can be generated by the individually controllable stripe electrodes SE so to create a polarisation grating with a predeterminable grating period.

Figure 18:
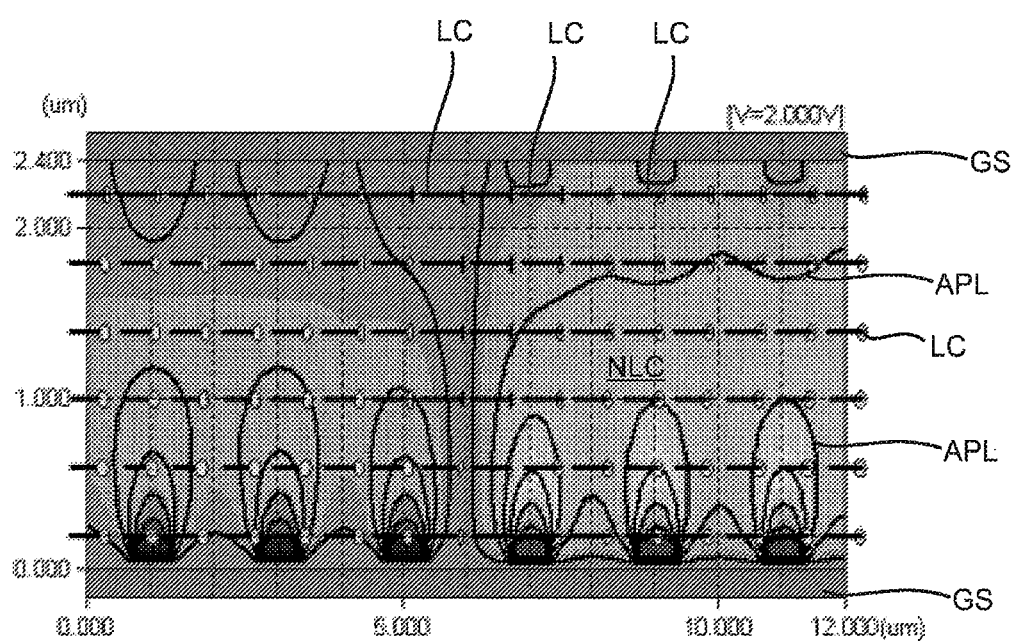
FIGS. 18 and 19 are sectional views, each showing an electric field distribution for the embodiment of FIG. 17.

FIG. 18 is a section through the arrangement that shows the layer structure and simulation data, illustrating the equipotential lines when controlling the alignment means. In this example, the grating period to be set is 6 times the electrode distance. In contrast to the plane base electrode GE, 3 stripe electrodes SE are supplied with negative voltage, while 3 stripe electrodes SE are supplied with positive voltage. Equipotential lines which run parallel to the substrate GS represent an out-of-plane component of the field. As can be seen in the drawing, there is an out-of-plane field above the electrodes SE. This defines a clockwise direction of rotation for half a grating period and a counter-clockwise direction of rotation for the other half.

Figure 19:
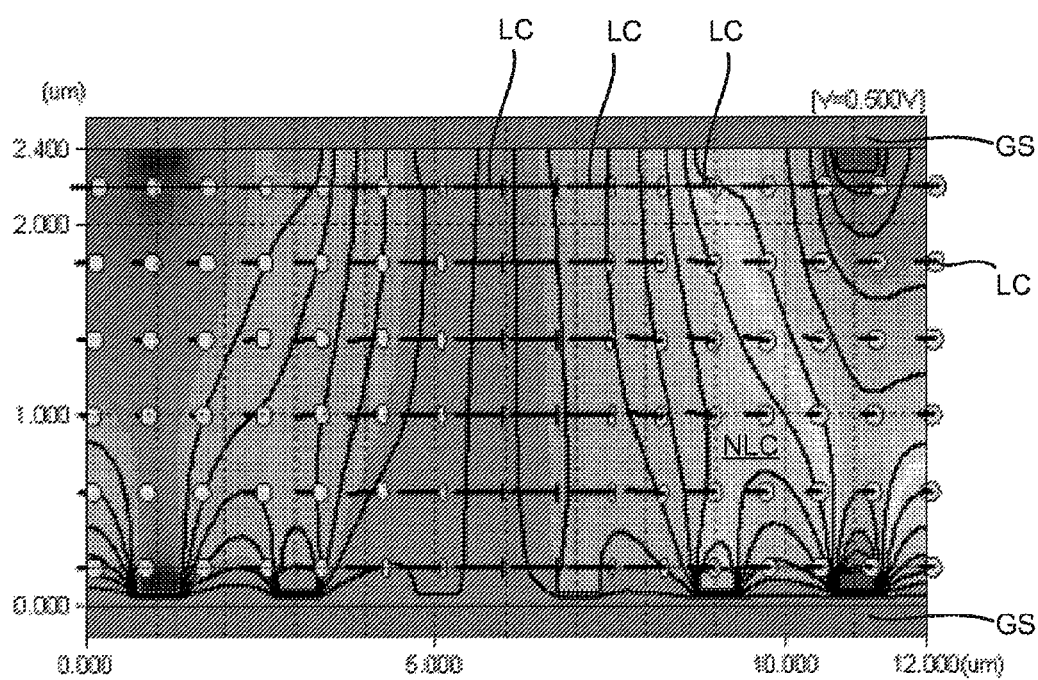

FIG. 19 shows the control situation with substantially in-plane fields (equipotential lines run perpendicular to the substrate GS) in the LC layer and with substantially out-of-plane fields (equipotential lines run parallel to the substrate GS) in the switchable alignment means. The orientation of the LC molecules is shown schematically in the form of needles. It can be seen that the needles on the left point beyond the drawing plane, while the needles on the right point in front of the drawing plane and the needles LC in the centre lie parallel to the drawing plane. This demonstrates the desired rotation of the LC molecules by 180 degrees within one set grating period.

The two types of fields illustrated in FIGS. 18 and 19 can optionally be realised subsequently so to provide a two-stage control, or the type of field illustrated in FIG. 19 can be used on its own, because it already comprises the desired out-of-plane and in-plane fields. In a simplified version of this embodiment, it is preferably possible to do without the in-plane electrodes of the second substrate. This makes the mechanical alignment of the two substrates superfluous.

Finally, it must be said that the embodiments described above shall solely be understood to illustrate the claimed teaching, but that the claimed teaching is not limited to these embodiments.

CITATIONS

[1] Ph. J. Martin, "Recent Patents on Liquid Crystal Alignment", Recent Patents on Material Science 2008, 1, 21-28.
[2] L. M. Blinov, V. G. Chigrinov, "Electrooptic Effects in Liquid Crystal Materials", Springer Verlag, 1994.
[3] Jong-Hyun Kim, Makoto Yoneya & Hiroshi Yokoyama, "Tristable nematic liquid-crystal device using micropatterned surface alignment", Nature, 420, p. 159-162, 2002
[4] S. Pancharatnam Proc. Ind. Acad. Sci, p. 137, 1955
[5] L. Shi, P. F. MacManamon, P. J. Bos, "Liquid crystal optical phase plate with variable in-plane gradient", J. Appl. Phys., 104, 0033109, 2008
[6] L. Komitov, Journal of the SID 2008, p. 919-925
[7] J. E. Stockley, S. A. Serati, G. D. Sharp, P. Wang, K. F. Walsh and K. M. Johnson "Broadband beam steering", Proc SPIE Vol. 3131, 1997

The invention claimed is:

1. A light modulator for a display for the presentation of two- and/or three-dimensional image contents, comprising:
   two opposing substrates and electrodes,
   at least one liquid crystal layer is provided between the two substrates, an alignment means provided on the surface of the substrate which faces the liquid crystal layer to set a predeterminable initial alignment of the liquid crystals, where the orientation of the liquid crystals can be controlled in a predeterminable range through an electric field which is generated by the electrodes, the alignment means is of a controllable type and is controllable during the operation of the light modulator such that the initial alignment of the liquid crystals is changeable, and if the initial alignment of the liquid crystals is modified then the alignment of the liquid crystals in an electric field can be controlled such that the orientation of the liquid crystals is orientable outside the given range or such that the initial alignment of the liquid crystals is settable in a predeterminable way in dependency of a predetermined location.

2. Light modulator according to claim 1, wherein the alignment means can be controlled such that the liquid crystals can rotate in a deterministic way.

3. Light modulator according to claim 1, further comprising regularly arranged pixels, where the pixels are made such to modulate the phase of the light which interacts with the light modulator, where a pixel preferably modulates the light which interacts with the pixel substantially in the same way across the entire surface of the pixel.

4. Light modulator according to claim 3, further comprising a reflective working principle, where the liquid crystal layer realises the function of a variable λ/2 plate, where circular polarised light to be modulated passes through the liquid crystals and a λ/4 plate which is disposed downstream of the liquid crystal layer and is reflected by a reflective layer and passes through the λ/4 plate and through the liquid crystal layer again.

5. Light modulator according to claim 3, further comprising a reflective working principle, where the liquid crystal layer realises the function of a variable λ/4 plate, where circular polarised light to be modulated passes through the liquid crystals and is reflected by a reflective layer and passes through the liquid crystal layer again.

6. Light modulator according to claim 3, wherein the light which interacts with the light modulator is changeable with a substantially constant phase value substantially across the entire cross section of a pixel of the light modulator.

7. Light modulator according to claim 1, wherein substantially linear electrodes and/or a planar electrode are provided on at least one substrate.

8. Light modulator according to claim 1, wherein the surface orientation is set such that the liquid crystals are substantially aligned with a first predeterminable initial alignment in a first local region of the light modulator, in that in a second local region of the light modulator the liquid crystals are aligned by the alignment means with a second predeterminable initial alignment, which is turned by a first angle in relation to the first initial alignment, and in that in a third local region of the light modulator the liquid crystals are aligned by the alignment means with a third predeterminable initial alignment, which is turned in relation to the first initial alignment by a second angle which has substantially the same absolute value as the first angle but which is turned in the opposite direction.

9. Light modulator according to claim 8, wherein the first predeterminable initial alignment of the liquid crystals is substantially parallel or perpendicular to the surface normal of a substrate.

10. Light modulator according to claim 8, wherein the first predeterminable initial alignment of the liquid crystals is substantially parallel or perpendicular to the longitudinal axis of substantially linear shaped electrodes.

11. Light modulator according to claim 1, wherein by applying electric fields of locally different strength and/or direction the liquid crystals can be oriented in a predeterminable way such that a continuous angular distribution of the liquid crystals between 0 and 360 degrees is achieved in relation to the initial alignment with a variably controllable grating period.

12. Light modulator according to claim 1, wherein at least one temperature sensor is provided for measuring the current temperature of the light modulator in order to take the measured current temperature into account when controlling the light modulator.

13. Light modulator according to claim 1, further comprising a UV filter for preventing the entry of UV light into the light modulator and thus to slow down chemical ageing of the materials of the light modulator.

14. Light modulator according to claim 1, wherein FLC molecules or CNTs are directly bonded chemically with a polyimide alignment means—for example via a functional group.

15. A display, in particular to a stereoscopic or holographic display, further comprising a light modulator according to claim 1.

16. A method for operating a light modulator according to claim 1, comprising the following process steps:
  a) Setting of at least one predeterminable orientation of the liquid crystals and, as the case may be, setting of at least one predeterminable initial alignment of the liquid crystals with the help of the alignment means
  b) Setting of an orientation that differs from the predeterminable orientation of the liquid crystals
  c) If the orientation that differs from the predeterminable orientation of the liquid crystals lies outside the given range of liquid crystal orientations, setting of a predeterminable initial alignment of the liquid crystals with the help of the alignment means such that the orientation that differs from the predeterminable orientation of the liquid crystals is settable.

* * * * *